US012683898B2

(12) United States Patent
Chunduri et al.

(10) Patent No.: US 12,683,898 B2
(45) Date of Patent: Jul. 14, 2026

(54) CONDITIONAL ROUTING DELIVERY IN A COMPROMISED NETWORK

(71) Applicant: Huawei Technologies Co., Ltd., Shenzhen (CN)

(72) Inventors: Uma S. Chunduri, Fremont, CA (US); Stewart Bryant, Merstham (GB); Alexander Clemm, Los Gatos, CA (US); Toerless Eckert, Mountain View, CA (US); Richard Li, Fremont, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 18/188,897

(22) Filed: Mar. 23, 2023

(65) Prior Publication Data

US 2023/0231798 A1     Jul. 20, 2023

Related U.S. Application Data

(63) Continuation of application No. PCT/US2020/070587, filed on Sep. 28, 2020.

(51) Int. Cl.
*H04L 47/127*     (2022.01)
*H04L 45/00*     (2022.01)
*H04L 45/302*     (2022.01)

(52) U.S. Cl.
CPC ............ *H04L 47/127* (2013.01); *H04L 45/22* (2013.01); *H04L 45/302* (2013.01)

(58) Field of Classification Search
None
See application file for complete search history.

(56) References Cited

U.S. PATENT DOCUMENTS

| | | | |
|---|---|---|---|
| 7,836,156 B1 * | 11/2010 | Ou | ........................ H04L 41/12 |
| | | | 709/224 |
| 9,253,079 B2 * | 2/2016 | Ernström | ................ H04L 45/18 |
| 9,923,798 B1 | 3/2018 | Bahadur et al. | |
| 10,567,293 B1 * | 2/2020 | Pularikkal | ............ H04L 45/306 |

(Continued)

FOREIGN PATENT DOCUMENTS

WO     WO-2022066199 A1     3/2022

OTHER PUBLICATIONS

"International Application Serial No. PCT/US2020/070587, International Search Report mailed May 27, 2021", 4 pgs.

(Continued)

*Primary Examiner* — Mariela Vidal Carpio
(74) *Attorney, Agent, or Firm* — Schwegman Lundberg & Woessner, P.A.

(57)     ABSTRACT

A computer-implemented method for processing a data packet in a network node includes determining a level of deterioration of a primary path between the network node and the destination node. The determined level of deterioration is based at least on a non-congestion-related loss for a primary link associated with one or more subsequent hops of the data packet from the network node toward the destination node along the primary path. Based on the determined level of deterioration of the primary path being above a threshold, the primary path is changed to an alternate path from the network node to the destination node. The data packet is forwarded to a next network node on the alternate path.

19 Claims, 10 Drawing Sheets

(56) References Cited

U.S. PATENT DOCUMENTS

| | | | | |
|---|---|---|---|---|
| 12,402,061 | B2 * | 8/2025 | Wei | H04W 40/12 |
| 2007/0058679 | A1 * | 3/2007 | Pelletier | H04W 28/06 |
| | | | | 370/477 |
| 2007/0183317 | A1 * | 8/2007 | Vasseur | H04J 3/14 |
| | | | | 370/225 |
| 2014/0010147 | A1 * | 1/2014 | Cao | H04L 1/1867 |
| | | | | 370/315 |
| 2014/0355447 | A1 | 12/2014 | Gohite et al. | |
| 2015/0263963 | A1 * | 9/2015 | Minakuchi | H04L 47/34 |
| | | | | 370/392 |
| 2016/0021014 | A1 * | 1/2016 | Wetterwald | H04L 47/2441 |
| | | | | 370/235 |
| 2016/0028616 | A1 * | 1/2016 | Vasseur | H04L 41/147 |
| | | | | 370/412 |
| 2016/0142222 | A1 * | 5/2016 | Fang | H04W 72/04 |
| | | | | 370/235 |
| 2016/0182177 | A1 * | 6/2016 | Weiny | H04L 67/34 |
| | | | | 370/392 |
| 2016/0277280 | A1 * | 9/2016 | Liu | H04L 45/74 |
| 2017/0012848 | A1 * | 1/2017 | Zhao | H04L 43/0882 |
| 2017/0053258 | A1 * | 2/2017 | Carney | H04L 45/22 |
| 2017/0134268 | A1 * | 5/2017 | Easale | H04L 45/50 |
| 2018/0069780 | A1 * | 3/2018 | Dhanabalan | H04L 41/0896 |
| 2018/0234524 | A1 * | 8/2018 | Cheng | H04W 28/02 |
| 2018/0367457 | A1 * | 12/2018 | Minakuchi | H04L 47/11 |
| 2019/0082363 | A1 * | 3/2019 | Park | H04W 36/0055 |
| 2019/0104075 | A1 | 4/2019 | Li et al. | |
| 2019/0104437 | A1 * | 4/2019 | Bartfai-Walcott | |
| | | | | H04W 28/0231 |
| 2019/0319873 | A1 * | 10/2019 | Shelar | H04L 45/24 |
| 2020/0099610 | A1 * | 3/2020 | Heron | H04L 45/04 |
| 2020/0187079 | A1 * | 6/2020 | Nagakubo | H04W 40/36 |
| 2020/0267717 | A1 * | 8/2020 | Ramanath | H04W 72/51 |
| 2020/0404569 | A1 * | 12/2020 | Cho | H04W 24/02 |
| 2021/0029021 | A1 * | 1/2021 | Torvi | H04L 45/125 |
| 2021/0084506 | A1 * | 3/2021 | Kimba Dit Adamou | |
| | | | | H04L 45/28 |
| 2021/0105698 | A1 * | 4/2021 | Jactat | H04L 45/302 |
| 2021/0105795 | A1 * | 4/2021 | Zhu | H04W 72/542 |
| 2021/0144086 | A1 * | 5/2021 | Bidgoli | H04L 45/42 |
| 2021/0258249 | A1 * | 8/2021 | Torvi | H04L 45/566 |
| 2021/0297327 | A1 * | 9/2021 | Kumar | H04L 41/5045 |
| 2022/0006726 | A1 * | 1/2022 | Michael | H04L 45/745 |
| 2022/0151006 | A1 * | 5/2022 | Muhammad | H04W 76/20 |
| 2022/0159768 | A1 * | 5/2022 | Zhu | H04L 1/1874 |
| 2022/0279383 | A1 * | 9/2022 | Amend | H04W 28/082 |
| 2023/0049573 | A1 * | 2/2023 | Zhang | H04W 40/22 |
| 2023/0292217 | A1 * | 9/2023 | Jung | H04W 40/14 |
| 2024/0129802 | A1 * | 4/2024 | Wang | H04L 1/1864 |

OTHER PUBLICATIONS

"International Application Serial No. PCT/US2020/070587, Written Opinion mailed May 27, 2021", 7 pgs.

"IS-IS TLV Codepoints", [online]. [retrieved Jun. 19, 2020]. Retrieved from the Internet: <URL: https://www.jana.org/assignments/isis-tiv-codepoints/isis-tiv-codepoints.xhtml>, (created May 6, 2003; updated Jun. 17, 2020), 12 pgs.

"Multiprotocol Label Switching", Wikipedia, (Jun. 8, 2020), 7 pgs.

"The Loss Network for Data Centers", Huawei Technologies Co. Ltd., Revision 1.0, (Nov. 7, 2017), 1-14 (15 pgs.).

Atlas, A., et al., "RFC 5286, Basic Specification for IP Fast Reroute: Loop-Free Alternates", RFC 5286, Network Working Group, (Sep. 2008), 31 pgs.

Bryant, S., et al., "Preferred Path Loop-Free Alternative (pIFA)", Futurewei Technologies Inc., Routing Area Working Group, (Jul. 2, 2019), 20 pgs.

Bryant, S., et al., "RFC 7490, Remote Loop-Free Alternative", Internet Engineering Task Force (IETF), (Apr. 2015), 29 pgs.

Chunduri, U., "Preferred Path Routing (PPR) in IS-IS", LSR Working Group, (Mar. 8, 2020), 26 pgs.

Chunduri, U., et al., "Resources for Preferred Path Routes in IGPs", LSR Working Group, (Jul. 16, 2018), 16 pgs.

Edgeworth, Brad, et al., "Introduction of Performance Routing (Pfr)", [online]. [retrieved Jun. 19, 2020]. Retrieved from the Internet: <URL: https://www.ciscopress.com/articles/article.asp?p=2755712>, (Jan. 10, 2016), 6 pgs.

Filsfils, C., et al., "RFC 8402, Segment Routing Architecture", Internet Engineering Task Force, (Jul. 2018), 32 pgs.

Giacalone, S., et al., "RFC 7471, OSPF Traffic Engineering (TE) Metric Extensions", (Mar. 2015), 19 pgs.

Ginsburg, L., et al., "RFC 8570, IS-IS Traffic Engineering (TE) Metric Extensions", Internet Engineering Task Force (IETF), (Mar. 2019), 22 pgs.

Litkowski, S., et al., "Topology Independent Fast Reroute using Segment Routing", Network Working Group, (Mar. 4, 2020), 25 pgs.

Richard Li, et al., "New IP: A Data Packet Framework to Evolve the Internet", 12 pgs.

Shand, M., et al., "RFC 5714, IP Fast Reroute Framework", Internet Engineering Task Force (IETF), (Jan. 2010), 15 pgs.

"International Application Serial No. PCT/US2020/070587, International Preliminary Report on Patentability mailed Apr. 6, 2023", 9 pgs.

* cited by examiner

*302*   *304*

| TYPE | LENGTH | |
|------|--------|--|
| RESERVED | CONGESTION LOSS | |

*308*

*306*

*300*

*312*   *314*

| TYPE | LENGTH | |
|------|--------|--|
| RESERVED | NON-CONGESTION LOSS | |

*318*

*316*

*310*

600

RECEIVE A DATA PACKET INCLUDING CONDITIONAL COMMANDS —602

UNPROCESSED CONDITIONAL COMMANDS? 610

NO

YES

GET A CONDITIONAL COMMAND 612

ALL CONDITIONS SATISFIED? 614

NO

YES

EXECUTE COMMAND 616

FURTHER PROCESS PACKET AND DISPATCH TO THE NEXT LINK 618

700

SET UP ALTERNATE PATHS ~ 702

ENABLE NODES TO
PROCESS PACKET
CONDITIONS ~ 704

SIGNAL GRANULAR PATH
PARAMETERS TO CENTRAL
CONTROLLER OR TO
OTHER NODES ~ 706

PROGRAM THRESHOLD
CONDITIONS IN FIB AT LINK
LEVEL WITH PARAMETERS
TO IDENTIFY PATHS ~ 708

PROVIDE PACKETS TO
NETWORK ~ 710

CONDITIONAL ROUTING DELIVERY IN A COMPROMISED NETWORK

CROSS-REFERENCE TO RELATED APPLICATIONS

This application is a continuation of International Application No. PCT/US2020/070587, filed on Sep. 28, 2020, entitled "CONDITIONAL ROUTING DELIVERY IN A COMPROMISED NETWORK," the benefit of priority of which is claimed herein, and which application is hereby incorporated herein by reference in its entirety.

TECHNICAL FIELD

The disclosure generally relates to packet routing in a computer network and, in particular, to a mechanism for routing packets around links in a compromised network (e.g., a network experiencing a non-congestion-related loss).

BACKGROUND

Networks in which a node or link fails while transferring data flows may be dynamically modified to re-route the data flows around the failed node or link. One method for re-routing includes Internet Protocol Fast Re-Route (IP FRR) described in RFC (Request for Comments) 5714 of the Internet Engineering Task Force (IETF). Another method, described in RFC 5286 and RFC 7490, performs fast re-routing using local Loop-Free Alternatives (LFAs) or Remote LFAs (RLFSs). These methods are mainly for Best Effort (BE) paths computed using a shortest-path algorithm, such as for example, Open Shortest Path First (OSPF) or Intermediate System to Intermediate System (IS-IS). Other methods may be used to route data flows along Traffic Engineering (TE) paths. Segment Routing (SR) described in RFC 8402 can be used to generate TE paths. Data streams routed using SR may be rerouted around a failed link or node using a Fast Re-Route (FRR) method. One such FRR method is Topology Independent Loop Free Alternative (TI LFA FRR), described in an ITEF Network Working Group Internet Draft dated Mar. 4, 2020, by L. Litkowski and entitled "Topology Independent Fast Re-route using Segment Routing draft-ietf-rtgwg-segment-routing-ti-lfa-03". Preferred Path Routing (PPR) is an alternative to SR and may be used for TE routing. PPR is described in an ITEF LSR Working Group Internet Draft dated Mar. 8, 2020, by U. Chunduri et al. and entitled, "Preferred Path Routing (PPR) in IS-ISdraft-chunduri-lsr-isis-preferred-path-routing-05." PPR LFA is a routing scheme that provides TE backup paths when a link or node in a PPR path fails. PPR LFA is described in an ITEF Internet Draft by the Routing Area Working Group dated Jul. 2, 2019, by S. Bryant et al. and entitled "Preferred Path Loop-Free Alternative (pLFA) draft-briant-rtgwg-plfa-00." All of the above references are incorporated by reference herein, in their entireties.

The LFA/RLFA, TI LFA FRR, and PPR LFA re-routing methods described above re-route data flows when a link or node in the current path fails and a link or node becomes congested with traffic. Presently, there is no automatic mechanism to divert network traffic around a link or node that is experiencing non-congestion-related link layer packet loss that does not disable the link. As long as the link is operable to transfer data packets, the link remains active and the network continues to route traffic through the link even though the link exhibits a significant bit error rate (BER) loss. This type of loss may result from cyclic redundancy check (CRC) errors, hardware errors, high availability (HA) related errors, or certain physical layer (e.g., layer1) losses (e.g., an optical link in a data center running hot).

Currently, when traffic in a BE or TE path encounters a lossy link (e.g., a link exhibiting non-congestion-related loss) the traffic cannot be re-routed even if an alternative path (e.g., an LFA/RLFA path) is available. This is because the link or node of the primary path has not failed, even though it may exhibit significant non-congestion-related loss.

SUMMARY

Various examples are now described to introduce a selection of concepts in a simplified form, which are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for processing a data packet in a network node. The method includes determining a level of deterioration of a primary path between the network node and a destination node. The determined level of deterioration is based at least on a non-congestion-related loss for a primary link associated with one or more subsequent hops of the data packet from the network node toward the destination node along the primary path. Based on the determined level of deterioration of the primary path being above a threshold, the primary path is changed to an alternate path from the network node to the destination node, and the data packet is forwarded to a next network node on the alternate path.

In a first implementation form of the method according to the first aspect as such, the determining of the level of deterioration of the primary path includes determining a non-congestion-related loss for a next link associated with a next hop of the one or more subsequent hops of the data packet along the primary path. The changing the primary path to the alternate path includes changing the next link in the primary path to a next link in the alternate path and forwarding the data packet to the next link in the alternate path.

In a second implementation form of the method according to the first aspect as such or any implementation form of the first aspect, the next link associated with the next hop is directly coupled to the network node. The determining of the level of deterioration of the primary path includes determining a non-congestion-related loss for a remote link along the primary path, the remote link is at least one hop away from the next link. The changing the primary path to the alternate path includes changing the next link in the primary path to a next link in the alternate path based on the non-congestion-related loss for the remote link and forwarding the data packet to the next link in the alternate path.

In a third implementation form of the method according to the first aspect as such or any implementation form of the first aspect, the changing of the next link in the primary path to the next link in the alternate path includes determining non-congestion-related loss for the next link in the alternate path and changing the next link in the primary path to the next link in the alternate path when the next link in the alternate path exhibits less non-congestion-related loss than the next link in the primary path.

In a fourth implementation form of the method according to the first aspect as such or any implementation form of the first aspect, the determining non-congestion-related loss in the next link in the alternate path includes sending, by the network node, a probe packet to the destination node using the alternate path, and determining a measure of non-congestion-related loss of the next link of the alternate path based on a response to the probe packet received from the destination node.

In a fifth implementation form of the method according to the first aspect as such or any implementation form of the first aspect, the determining non-congestion-related loss for the next link in the alternate path or the next link in the primary path includes determining a bit error rate (BER).

In a sixth implementation form of the method according to the first aspect as such or any implementation form of the first aspect, a network controller is notified of the non-congestion-related loss.

In a seventh implementation form of the method according to the first aspect as such or any implementation form of the first aspect, a measure of congestion-related loss is determined for the primary path, and the network controller is notified of the measure of congestion-related loss to the network controller.

In an eighth implementation form of the method according to the first aspect as such or any implementation form of the first aspect, the changing of the primary path to the alternate path further includes determining that a service requirement for the data packet indicates a performance level that is greater than a second threshold.

In a ninth implementation form of the method according to the first aspect as such or any implementation form of the first aspect, the primary path is a traffic-engineered (TE) path conforming to at least one service level objective (SLO) and the alternate path is a pre-provisioned alternate TE path conforming to the SLO of the primary path.

In a tenth implementation form of the method according to the first aspect as such or any implementation form of the first aspect, the primary path is a best-effort (BE) path and the alternate path is a loop-free alternative (LFA), remote loop-free alternative (RLFA) path or an Internet protocol fast reroute (IP FRR) path.

In an eleventh implementation form of the method according to the first aspect as such or any implementation form of the first aspect, the data packet includes a conditional command specifying at least a condition and a command, the condition specifying the threshold for the level of deterioration of the primary path, and the command specifying the changing of the primary path to the alternate path when the determined level of deterioration of the primary path is above the threshold.

In a twelfth implementation form of the method according to the first aspect as such or any implementation form of the first aspect, the changing the primary path to the alternate path is based on execution of the command.

According to a second aspect of the present disclosure, there is provided a system for processing a data packet in a network node. The system includes memory storing instructions and one or more processors in communication with the memory. The one or more processors execute the instructions to perform operations including determining a level of deterioration of a primary path between the network node and a destination node. The determined level of deterioration is based at least on a non-congestion-related loss for a primary link associated with one or more subsequent hops of the data packet from the network node toward the destination node along the primary path. Based on the determined level of deterioration of the primary path being above a threshold, the primary path is changed to an alternate path from the network node to the destination node, and the data packet is forwarded to a next network node on the alternate path.

In a first implementation form of the system according to the second aspect as such, the determining of the level of deterioration of the primary path includes determining a non-congestion-related loss for a next link associated with a next hop of the one or more subsequent hops of the data packet along the primary path. The changing the primary path to the alternate path includes changing the next link in the primary path to a next link in the alternate path and forwarding the data packet to the next link in the alternate path.

In a second implementation form of the system according to the second aspect as such or any implementation form of the second aspect, the next link associated with the next hop is directly coupled to the network node. The determining of the level of deterioration of the primary path includes determining a non-congestion-related loss for a remote link along the primary path, the remote link is at least one hop away from the next link. The changing the primary path to the alternate path includes changing the next link in the primary path to a next link in the alternate path based on the non-congestion-related loss for the remote link and forwarding the data packet to the next link in the alternate path.

In a third implementation form of the system according to the second aspect as such or any implementation form of the second aspect, the changing of the next link in the primary path to the next link in the alternate path includes determining non-congestion-related loss for the next link in the alternate path and changing the next link in the primary path to the next link in the alternate path when the next link in the alternate path exhibits less non-congestion-related loss than the next link in the primary path.

In a fourth implementation form of the system according to the second aspect as such or any implementation form of the second aspect, the determining non-congestion-related loss in the next link in the alternate path includes sending, by the network node, a probe packet to the destination node using the alternate path, and determining a measure of non-congestion-related loss of the next link of the alternate path based on a response to the probe packet received from the destination node.

In a fifth implementation form of the system according to the second aspect as such or any implementation form of the second aspect, the determining non-congestion-related loss for the next link in the alternate path or the next link in the primary path includes determining a bit error rate (BER).

In a sixth implementation form of the system according to the second aspect as such or any implementation form of the second aspect, the operations further include notifying a network controller of the non-congestion-related loss.

In a seventh implementation form of the system according to the second aspect as such or any implementation form of the second aspect, the operations further include determining a measure of congestion-related loss for the primary path and notifying the network controller of the measure of congestion-related loss to the network controller.

In an eighth implementation form of the system according to the second aspect as such or any implementation form of the second aspect, the changing of the primary path to the alternate path further includes determining that a service requirement for the data packet indicates a performance level that is greater than a second threshold.

In a ninth implementation form of the system according to the second aspect as such or any implementation form of the second aspect, the primary path is a traffic-engineered (TE)

path conforming to at least one service level objective (SLO) and the alternate path is a pre-provisioned alternate TE path conforming to the SLO of the primary path.

In a tenth implementation form of the system according to the second aspect as such or any implementation form of the second aspect, the primary path is a best-effort (BE) path and the alternate path is a loop-free alternative (LFA), remote loop-free alternative (RLFA) path or an Internet protocol fast reroute (IP FRR) path.

In an eleventh implementation form of the system according to the second aspect as such or any implementation form of the second aspect, the data packet includes a conditional command specifying at least a condition and a command, the condition specifying the threshold for the level of deterioration of the primary path, and the command specifying the changing of the primary path to the alternate path when the determined level of deterioration of the primary path is above the threshold.

In a twelfth implementation form of the system according to the second aspect as such or any implementation form of the second aspect, the changing the primary path to the alternate path is based on execution of the command.

According to a third aspect of the present disclosure, there is provided a non-transitory computer-readable medium storing instructions for processing a data packet in a network node. When executed by one or more processors, the instructions cause the one or more processors to perform operations including determining a level of deterioration of a primary path between the network node and a destination node. The determined level of deterioration is based at least on a non-congestion-related loss for a primary link associated with one or more subsequent hops of the data packet from the network node toward the destination node along the primary path. Based on the determined level of deterioration of the primary path being above a threshold, the primary path is changed to an alternate path from the network node to the destination node, and the data packet is forwarded to a next network node on the alternate path.

In a first implementation form of the computer-readable medium according to the third aspect as such, the determining of the level of deterioration of the primary path includes determining a non-congestion-related loss for a next link associated with a next hop of the one or more subsequent hops of the data packet along the primary path. The changing the primary path to the alternate path includes changing the next link in the primary path to a next link in the alternate path and forwarding the data packet to the next link in the alternate path.

In a second implementation form of the computer-readable medium according to the third aspect as such or any implementation form of the third aspect, the next link associated with the next hop is directly coupled to the network node. The determining of the level of deterioration of the primary path includes determining a non-congestion-related loss for a remote link along the primary path, the remote link is at least one hop away from the next link. The changing the primary path to the alternate path includes changing the next link in the primary path to a next link in the alternate path based on the non-congestion-related loss for the remote link and forwarding the data packet to the next link in the alternate path.

In a third implementation form of the computer-readable medium according to the third aspect as such or any implementation form of the third aspect, the changing of the next link in the primary path to the next link in the alternate path includes determining non-congestion-related loss for the next link in the alternate path and changing the next link in the primary path to the next link in the alternate path when the next link in the alternate path exhibits less non-congestion-related loss than the next link in the primary path.

In a fourth implementation form of the computer-readable medium according to the third aspect as such or any implementation form of the third aspect, the determining non-congestion-related loss in the next link in the alternate path includes sending, by the network node, a probe packet to the destination node using the alternate path, and determining a measure of non-congestion-related loss of the next link of the alternate path based on a response to the probe packet received from the destination node.

In a fifth implementation form of the computer-readable medium according to the third aspect as such or any implementation form of the third aspect, the determining non-congestion-related loss for the next link in the alternate path or the next link in the primary path includes determining a bit error rate (BER).

In a sixth implementation form of the computer-readable medium according to the third aspect as such or any implementation form of the third aspect, the operations further include notifying a network controller of the non-congestion-related loss.

In a seventh implementation form of the computer-readable medium according to the third aspect as such or any implementation form of the third aspect, the operations further include determining a measure of congestion-related loss for the primary path and notifying the network controller of the measure of congestion-related loss to the network controller.

In an eighth implementation form of the computer-readable medium according to the third aspect as such or any implementation form of the third aspect, the changing of the primary path to the alternate path further includes determining that a service requirement for the data packet indicates a performance level that is greater than a second threshold.

In a ninth implementation form of the computer-readable medium according to the third aspect as such or any implementation form of the third aspect, the primary path is a traffic-engineered (TE) path conforming to at least one service level objective (SLO) and the alternate path is a pre-provisioned alternate TE path conforming to the SLO of the primary path.

In a tenth implementation form of the computer-readable medium according to the third aspect as such or any implementation form of the third aspect, the primary path is a best-effort (BE) path and the alternate path is a loop-free alternative (LFA), remote loop-free alternative (RLFA) path or an Internet protocol fast reroute (IP FRR) path.

In an eleventh implementation form of the computer-readable medium according to the third aspect as such or any implementation form of the third aspect, the data packet includes a conditional command specifying at least a condition and a command, the condition specifying the threshold for the level of deterioration of the primary path, and the command specifying the changing of the primary path to the alternate path when the determined level of deterioration of the primary path is above the threshold.

In a twelfth implementation form of the computer-readable medium according to the third aspect as such or any implementation form of the third aspect, the changing the primary path to the alternate path is based on execution of the command.

Any of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
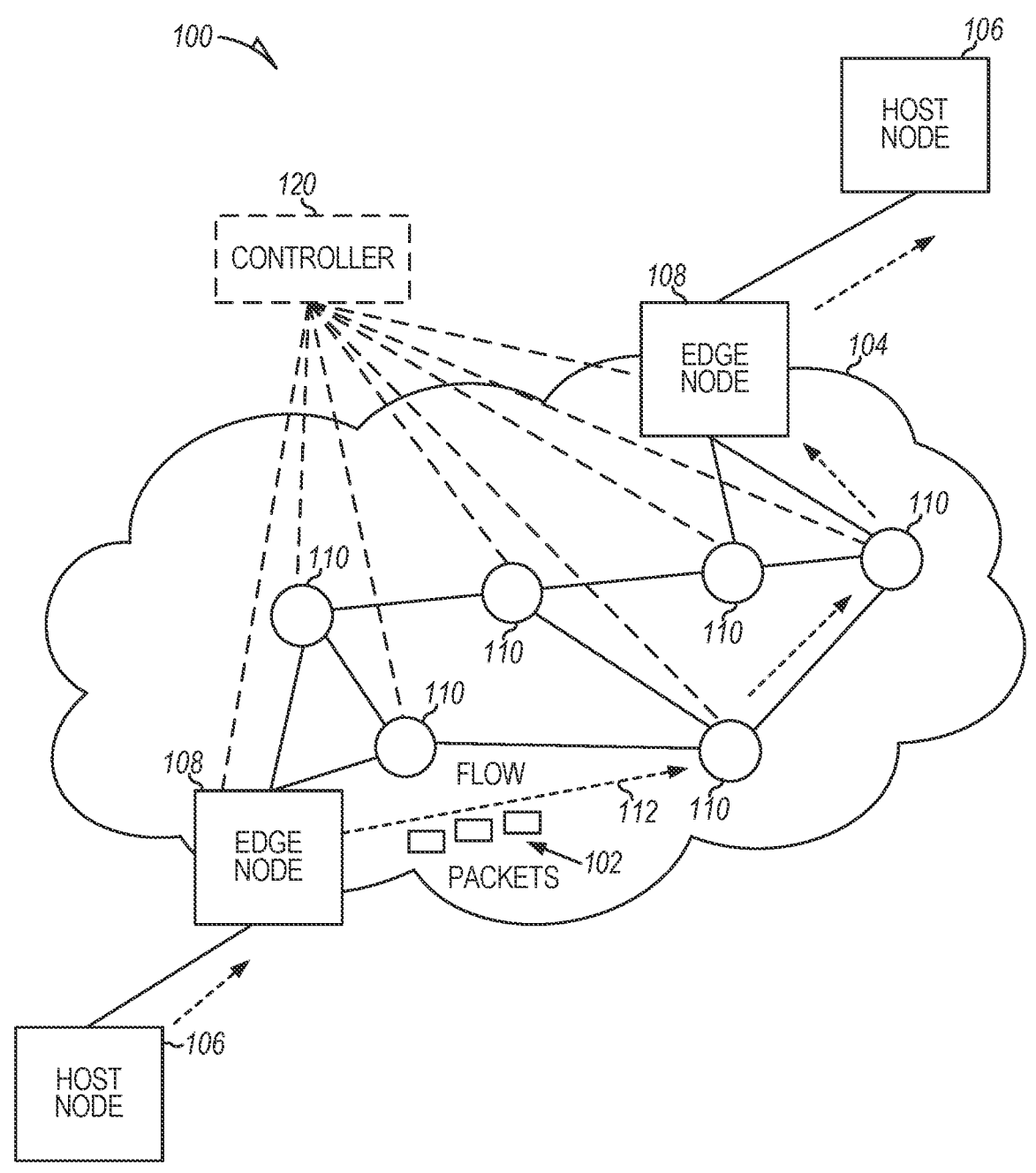
FIG. 1 is a diagram of an example network for routing data packets according to an example embodiment.

It should be understood at the outset that although an illustrative implementation of one or more embodiments is provided below, the disclosed systems and methods described concerning FIGS. 1-10 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

This application concerns methods and apparatuses for routing network traffic around lossy links in primary paths, TE primary paths, or BE primary paths (although other paths can also be used in accordance with the application). One or more of the primary, TE primary, or BE primary paths can comprise pre-provisioned paths. Embodiments described below enable conditional routing by dynamically switching the network traffic to an alternate TE path or an alternate BE path, upon detecting network deterioration. The examples described below have one or more pre-provisioned alternate TE paths or pre-provisioned alternate BE paths for TE or BE traffic, respectively. Embodiments determine a level of deterioration, where this level of deterioration quantifies an amount of loss at a node or link along the primary path. The loss comprises one or both of non-congestion-related loss or congestion-related loss. There may be multiple types of non-congestion-related loss or congestion-related loss. Embodiments compare the detected loss (i.e., the determined level of deterioration) to one or more thresholds. In some aspects, the thresholds comprise pre-provisioned thresholds that were carried in (and provided via) one or more packets. When the detected loss exceeds the threshold, the node switches the packets to use one of the alternate paths. Other embodiments switch from a primary path to a backup path when a detected loss of the backup path is less than the detected loss of the primary path. Example embodiments optionally advertise the detected losses to aid the network to route other packet streams. Some example embodiments limit re-routing to data streams having a Service Level Agreement (SLA) or a Service Level Objective (SLO) that requires relatively high performance.

An SLO may include a target value for a particular key performance indicator. In the embodiments described below, this performance indicator may be a measure of non-congestion-related loss. An SLA, on the other hand, may include several SLOs as well as other information, such as what remediation measures will be applied in case an SLO is violated, and contractual obligations (such as any payment penalties and such). The embodiments below measure the performance of the path against an SLO. This SLO, however, may be derived from multiple SLOs of the SLA.

It should be understood that although an illustrative implementation of one or more embodiments is provided below, the disclosed systems, methods, and/or apparatuses are described concerning FIGS. 1-10 and may be implemented using any number of other techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and which are shown, by way of illustration, embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of embodiments is, therefore, not to be taken in a limiting sense, and the scope of the present disclosure is defined by the appended claims. As used herein, the term "hop" is the trip (or movement) a data packet takes from one network node (e.g., a current network node) to another network node that is directly coupled to the current network node.

FIG. 1 is a diagram of an example network 100 for routing data packets according to an example embodiment. The network 100 includes host nodes 106, a network domain 104, and an optional network controller 120. The network domain 104 includes edge nodes 108 and internal nodes 110. The network domain 104 corresponds to a data plane of the network. An example network 100 also includes a control plane through which each of the edge nodes 108 and internal nodes 110 is coupled to the network controller 120. Alternatively, the network controller 120 may be coupled to the edge nodes 108, and the edge nodes 108 may exchange control data with the internal nodes 110 using Interior Gateway Protocol (IGP). In yet another alternative, the network 100 may not include the network controller 120 and the control plane may be co-extensive with the data plane. In this alternative, the edge nodes 108 and internal nodes 110 use IGP to exchange control information. The edge nodes 108 act as ingress and egress points and the internal nodes 110 communicate data, such as data flow 112 of data packets 102 through the network domain 104. The host nodes 106 may be connected to edge nodes 108 on wired links, optical links, 2G/3G/4G/5G wireless links, microwave links, and/or satellite links. The wired links may include network links or circuit-switched links. When a radio link connects the host and edge nodes, the edge node 108 may be a router connected to a Wi-Fi access point or a base station on a mobile phone network (e.g., an Evolved Node-B (eNB) or a next-generation Node-B (gNB) for a new radio (NR) communication system).

In the example for the network 100, the host nodes 106 are nodes that execute applications and communicate with other host nodes 106. The host nodes 106 may communicate by transmitting data flows 112 to other host nodes 106 via the network domain 104. A data flow 112 is a group of related communications between a common set of endpoints, such as host nodes 106. For example, applications operating on two host nodes 106 can initiate a communication session with each other. The data exchanged during the communication session may be transmitted as a data flow 112. The data in the data flow 112 is separated into data packets 102 for transmission. In some embodiments, a TE data flow 112 has packets 102 that each may have a header with routing information that includes nodes and/or links describing a path that meets one or more SLOs that define service level guarantees (e.g., tolerable non-congestion-related losses) for the data flow 112. In other embodiments, the path is controlled in the control plane, either by the network controller 120 or by the nodes 108 and 110 using IGP. Packet headers optionally might not include path information when the control plane controls the path. A BE data stream may also include routing information in the packet header. Alternatively, the routing information for packets in a BE data flow 112 may be in the control plane (e.g., the nodes 108 and 110 and/or the network controller 120). In addition to the packet headers, each packet 102 of the data flow 112 includes a payload containing the data exchanged between or among the host nodes 106 (e.g., as part of the communication session).

Although the example network 100 shows a single data flow 112, multiple data flows 112 may be transferred through the network either concurrently or over time. Each data flow 112 may be assigned a primary path through the network domain 104 by the network controller 120 or by one of the edge nodes 108. Embodiments described below include networks that use BE paths and the network controller 120 and/or the edge nodes 108 determine a path through the network using, for example, OSPF or IS-IS. In other embodiments, the network controller 120 and/or the edge nodes 108 employ traffic engineering to determine a TE path through the network using, for example, SR or PPR. A primary path may optionally be neither a BE path nor a TE path but a path from one edge node 108 to another edge node 108, with the path traversing links and internal nodes 110 that have been specified by a user. This type of path is referred to as a pre-provisioned path.

Network domain 104 includes a group of interconnected network components controlled by a common set of networking policies. It should be noted that, while network domain 104 is shown as a single domain, embodiments may be deployed in a multi-domain context that employs different network media and/or different network protocols. The network media may include, without limitation, wired links, wireless links, optical links, microwave links, and/or satellite links.

The edge nodes 108 are network devices that encapsulate packets or modify packet headers to facilitate processing as the packets are transferred through the network. For example, the packet headers may be modified to include contract information. The edge nodes 108 may modify the packet headers to implement security policies for the network domain 104, change network addresses of the data packet 102 according to network domain 104 addressing schemes, and/or manage the data flows 112 through the network domain 104 based on the state of the network as maintained by the network controller 120. Alternatively, each node 108 and 110 may maintain a description of the entire network or may maintain a description of only the nodes 108 and 110 to which the node is directly connected. The nodes 108 and/or 110 may maintain this description using IGP to share the state of the network with the other nodes 108 and 110. As another alternative, the network controller 120 may be coupled only to the edge nodes and information about the structure of the network may be transferred among the edge nodes 110 and the internal nodes 108 via IGP.

The edge nodes 108 may also modify the encapsulated packet headers to include conditional commands that may be executed by one or more of the internal nodes 110. These conditional commands instruct the nodes 110 to determine the health of a link and to route the packet around a broken link, a link that is experiencing a relatively high level of congestion, or a link that is experiencing an unacceptable level of non-congestion loss for the data flow 112. In some embodiments, the link which is assessed based on the conditional commands may include a link on a pre-configured primary path to a destination node. Additionally, the link that is assessed may be one or more hops away from a current network node (e.g., one of the internal nodes 110) that is processing the encapsulated packet header with the conditional command. Put another way, an internal network node that is currently processing the encapsulated header and is executing the conditional command may determine the health of the next link on the path to the destination node (e.g., the link between the current network node and a next network node along the path), or a link after the next link along the path to the destination node.

The internal nodes 110 are network devices, such as routers, that are configured to read header information of the data packets 102 and to process and forward the data packets 102 according to the header information. The edge nodes 108 and/or the internal nodes 110 may identify data flows 112 and determine that packets 102 (and corresponding context information) are associated with a corresponding data flow 112.

The Open Systems Interconnection (OSI) model characterizes networks in seven layers—the physical layer (L1), the data link layer (L2), the network layer (L3), the transport layer (L4), the session layer (L5), the presentation layer (L6), and the application layer (L7). The embodiments below are concerned with the L2 and L3 layers.

Currently, most packet routing occurs at L3. Many non-congestion-related losses, however, occur at L2. For example, a non-congestion-related loss may be the result of a disruption in satellite signals or in microwave signals typically used for backhauling in wireless networks. Additionally, non-congestion-related losses at L2 may occur in 5G front-haul and 5G mid-haul links. The embodiments described below apply to L3 routing when the links are exposed. The embodiments also apply to L2 routing services that use a link-state protocol to determine their forward paths. Even though the disclosed techniques are discussed herein in connection with non-congestion-related losses, similar techniques may also be used in network environments with congestion-related losses (or network environments with non-congestion-related losses leading to network congestion and congestion-related losses).

Figures 2A, 2B, 2C:
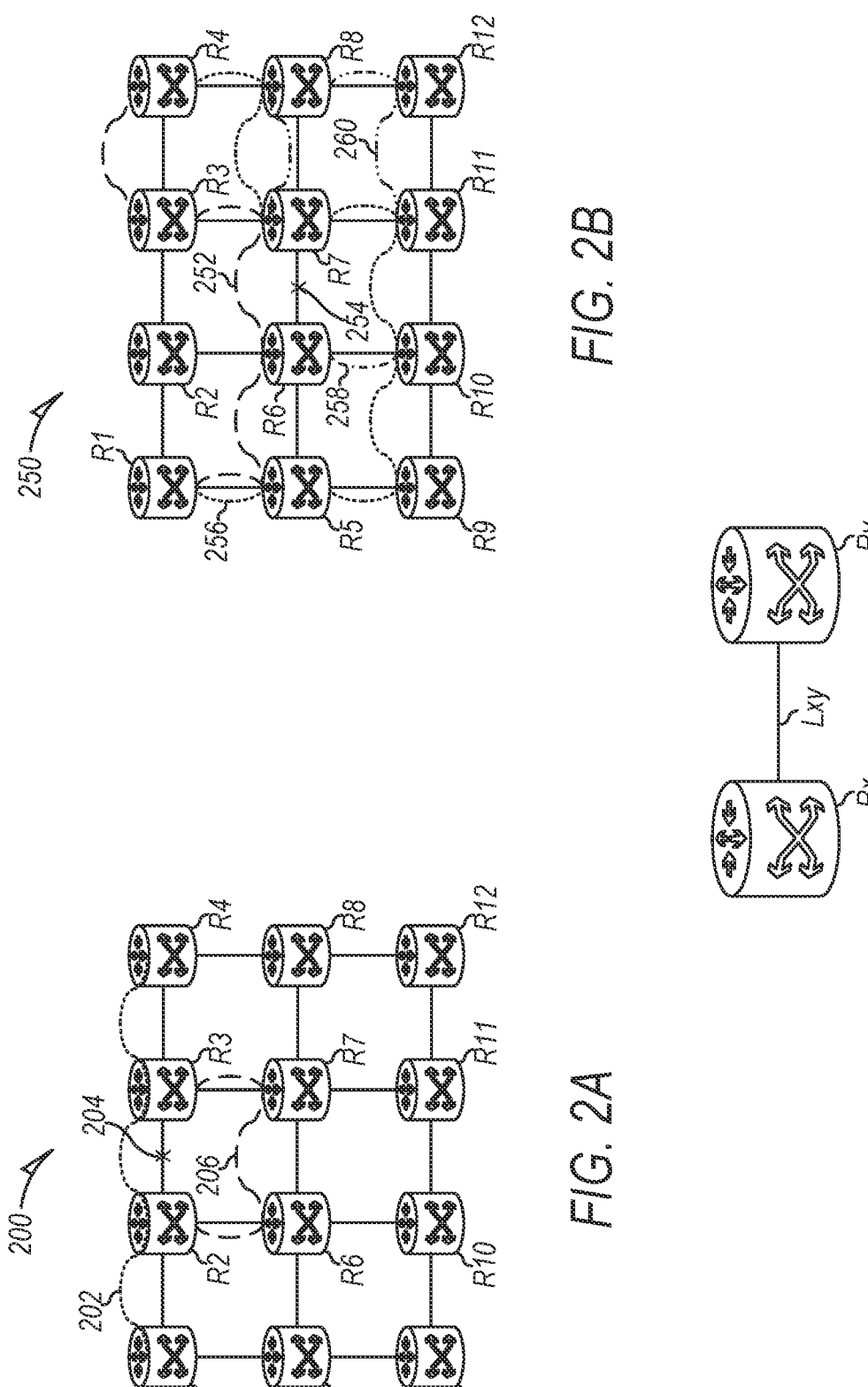
FIGS. 2A, 2B, and 2C are diagrams showing arrangements of network nodes according to example embodiments.

FIGS. 2A, 2B, and 2C are diagrams showing arrangements of network nodes according to example embodiments. Each of the networks 200 and 250 shown in FIGS. 2A and 2B may include both edge nodes 108 and internal nodes 110 or may be a subset of a network domain 104 that includes only internal nodes 110. Each of the networks 200 and 250 includes 12 nodes (e.g., nodes R1 through R12 connected by links indicated by the solid lines between adjacent nodes).

FIG. 2A shows a primary BE path 202 through the network 200 that successively routes packets through nodes R1, R2, and R3 to reach node R4. As described above, the primary BE path may be an IGP-computed SPF path. The network 200 also includes a pre-provisioned LFA path 206 including nodes R2, R6, R7, and R3 that may serve as an alternate path for the BE path 202. The pre-provisioned LFA path 206 may be stored in the forwarding information block (FIB) of one or more of the nodes 108 and/or 110. Similarly, when MPLS routing is used, a label defining an alternate MPLS path may be stored in the FIB of one or more of the nodes 108 and/or 110. A link between node R2 and node R3 may have deteriorated (e.g., experiencing a non-congestion-related loss) as indicated by the "x" 204 on the link connecting node R2 to node R3. The node R2 may detect this deterioration and automatically re-route traffic to the alternate path 206 to avoid the deteriorated link. Although network 200 includes a single pre-provisioned LFA path 206, it is contemplated that the network may include multiple pre-provisioned alternate paths to allow the nodes 108 and/or 110 to re-route packet flows 112 around other links and nodes 108 and/or 110 in the network 100.

FIG. 2B shows a primary TE path 252 through the network 250 that successively traverses nodes R1, R5, R6, R7, R3, and R4. The primary path 252 may be generated using SR or PPR, where each segment in the path satisfies one or more SLOs for the TE path. Non-congestion-related loss in any link or node (or a combination of links and nodes) along this path may result in packets assigned to path 252 being re-routed through one or more backup TE paths. The re-routing of packets through TE paths may be further limited such that re-routing is performed only for data flows 112 having ultra-low-loss SLOs. Data flows 112 having lower-level SLOs would continue to use the path with the non-congestion-related loss. Alternatively, different thresholds may be assigned to data flows 112 based on their respective SLOs allowing data flows having intermediate-level SLOs to be re-routed when the detected non-congestion-related loss exceeds a higher threshold than used for the ultra-low-loss SLOs.

In addition to the primary path 252, FIG. 2B shows three pre-provisioned backup TE paths: path 256, which traverses nodes R1, R5, R9, R10, R11, R7, R8, and R4; path 258, which traverses nodes R10 and R6; and path 260 which traverses nodes R11, R12, R8, and R7. Each of the links in each of these paths satisfies the one or more SLOs for the primary TE path 252. These three paths may be generated using PPR and maintained in a PPR route graph structure, as defined in an IETF LSR Working Group Draft dated Mar. 8, 2020, by U. Chunduri et al. and entitled "Preferred Path Route Graph Structure draft-ce-lsr-ppr-graph-03" which is incorporated by reference herein in its entirety. When one or more non-congestion-related losses are discovered in the primary path 252, for example, a loss in the link between nodes R6 and R7, as indicated by the "x" 254, the edge node can cause traffic to be re-routed along the backup path 256. Alternatively, node R6 may detect the loss and re-route the traffic to node R10, along backup path 258, and then along nodes R11, R7, R8, and R4 along backup path 260. As another alternative, node R6 may re-route the traffic to node R10 along backup path 258, to node R11, along backup path 256, and to nodes R12, R8, and R7, along backup path 260. From node R7, the traffic may be routed either through node R3 to node R4 along primary path 252 or through node R8 to node R4 along backup path 256.

FIG. 2C shows two nodes, Rx and Ry connected by a link Lxy. A non-congestion-related loss may occur in the nodes Rx and/or Ry or the link Lxy. Also, because traffic from node Rx to node Ry may use different hardware than traffic from node Ry to node Rx, embodiments described below separately measure non-congestion-related loss from node Rx to node Ry through link Lxy and from node Ry to node Rx through link Lxy.

Decisions to re-route traffic may be made by the network controller 120, by the edge nodes 108, and/or by the internal nodes 110. These decisions are made based on the detection of a non-congestion-related loss, as described below regarding FIG. 9. Some congestion-related losses (e.g., link latency, node latency, jitter, and/or reduced available bandwidth) may be combined with the non-congestion-related loss to determine whether to re-route the data flow 112 to an alternate or backup path. The network controller 120 and/or the nodes 110 make these decisions based on measured link loss for the links between the nodes in the current path. Described embodiments measure link loss (e.g., BER) at the node for each link from one node to another node. Alternatively, the non-congestion-related loss may be based on end-to-end (E2E) measurements of multiple paths through the network domain 104 from one edge node 108 to another edge node 108 and the portions of the measured loss may be attributed to each node/link along the path. Each internal node 110 may autonomously measure the non-congestion-related loss on each of its links. Alternatively, the network controller 120 may direct the loss measurements. The measurement values may be sent to the network controller 120 via control-plane connections between the internal nodes 110 and the network controller 120 or via IGP. Alternatively, each internal node 110 may use IGP to share its measurement values with other internal nodes 110 and with the edge nodes 108.

Figure 3A:
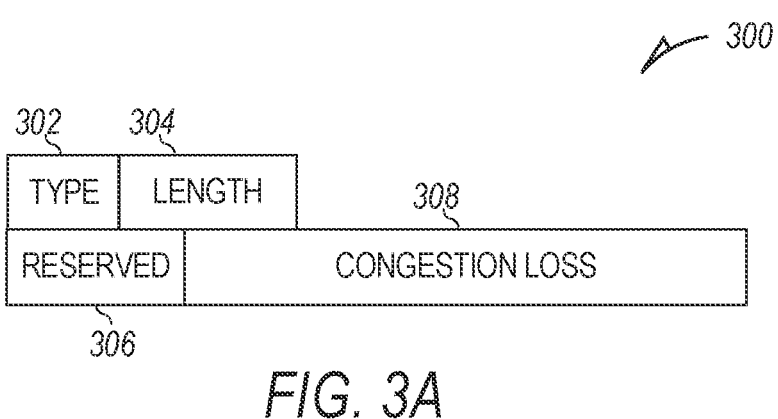
FIGS. 3A and 3B are data diagrams of type-length-value (TLV) records for advertising congestion packet loss and non-congestion path deterioration according to an example embodiment.
Figure 3B:
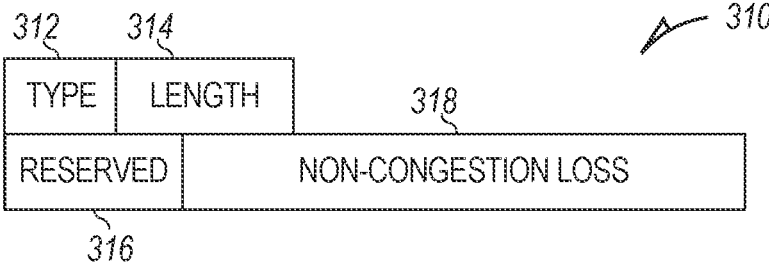

FIGS. 3A and 3B are data diagrams of type-length-value (TLV) elements 300 and 310 for advertising congestion packet loss and non-congestion path deterioration according to example embodiments. Example embodiments use these TLV elements to advertise loss data to other internal nodes 110, to the edge nodes 108, and/or to the network controller 120. In some embodiments, these elements are sent to the network controller 120 either directly through the control plane or via other internal nodes 110 and the edge nodes 108 using IGP. Alternatively, these elements may be advertised among the other internal nodes 110 using IGP. As an alternative to using TLV elements, the congestion-related losses and non-congestion-related-losses may be advertised using value fields having predetermined semantics and/or semantics that are defined by an encoding method.

TLV element 300 of FIG. 3A includes a type field 302, a length field 304, a reserved field 306, and a congestion loss field 308. The type field 302 is a 4-byte value that is determined from other TLV elements used in network 100. The length field 304 is a 4-byte field specifying the length of the congestion loss field 308. The reserved field 306 is a 4-byte field that is reserved for future use. The congestion loss field 308 is a variable-length field that includes information about the loss, such as, without limitation, the identity of the node or link associated with the loss, the type of loss, and the magnitude of the loss.

TLV element 310 of FIG. 3B includes a type field 312, a length field 314, a reserved field 316, and a non-congestion loss field 318. The type field 312 is a 4-byte value that is determined from other TLV elements used in the network 100 and is used to indicate that field 318 contains non-congestion loss data. The type field 312 has a different value than the type field 302 used to indicate that field 308 contains congestion loss data. The length field 314 is a 4-byte field specifying the length of the non-congestion loss field 318. The reserved field 316 is a 4-byte field that is reserved for future use. The non-congestion loss field 318 is a variable-length field that includes information about the loss, such as, without limitation, the identity of the node or link associated with the loss, the type of loss, and the magnitude of the loss.

Figure 4:
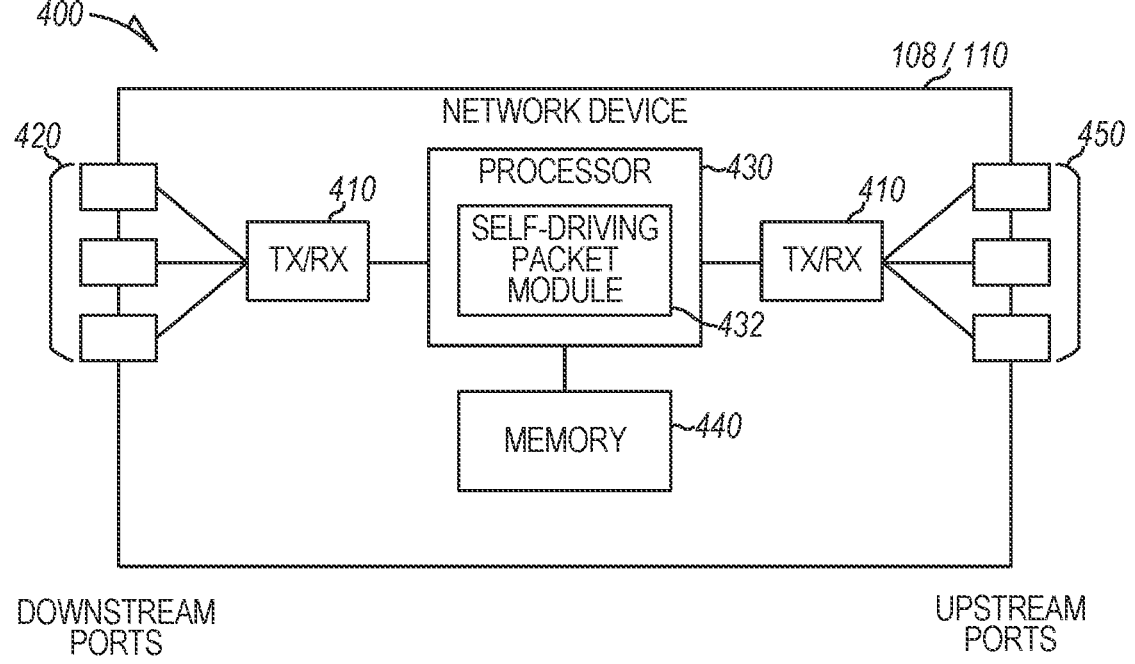
FIG. 4 is a diagram illustrating circuitry for performing methods by a network node to process self-routing packets according to an example embodiment.

FIG. 4 is a diagram illustrating a network device 400 for performing methods by a network node to process self-routing packets according to an example embodiment. For example, network device 400 may implement an edge node 108 and/or an internal node 110 in the network domain 104. Further, the network device 400 can be configured to implement methods 600, 700, 800, and 900, described below with reference to FIGS. 6, 7, 8, and 9, respectively, as well as other methods/mechanisms disclosed herein. For example, the network device 400 can receive and transmit data packets 102, such as the New IP Packet 102 described below with reference to FIG. 5. In example embodiments, each data packet 102 includes a header containing a conditional command block. The network device 400 may be configured to conditionally execute such commands, as described below with reference to FIG. 6. Such conditional command blocks can be implemented in a New IP packet header or a BPP header. Alternatively, the packet headers may not include conditional commands and the nodes 108 and/or 110 may include program instructions that configure the nodes 108 and/or 110 to implement the methods described herein. The nodes 108 and 110 may be pre-provisioned with these instructions or may dynamically receive the instructions from the network controller 120 via the control plane, either directly or via IGP or an edge node 108 via IGP.

Accordingly, network device 400 may be configured to implement or support the schemes/features/methods described herein. For instance, the features/methods discussed herein may be implemented using hardware, firmware, and/or software installed to run on hardware. Network device 400 is included for purposes of clarity of discussion but is in no way meant to limit the application of the present disclosure to a particular network device embodiment or class of network device embodiments.

The network device 400 may communicate electrical and/or optical signals through a network, e.g., a switch, router, bridge, or gateway. The example network device 400 includes multiple downstream ports 420, two transceivers 410, a processor 430, a memory 440, and multiple upstream ports 450. The transceivers (Tx/Rx) 410 may be transmitters, receivers, or combinations thereof. The downstream ports 420 and/or upstream ports 450 may contain wireless, electrical, and/or optical transmitting and/or receiving components, depending on the embodiment.

Memory 440 may include volatile memory and/or non-volatile memory. Network device 400 may include—or have access to a computing environment that includes—a variety of computer-readable media, such as volatile memory and non-volatile memory, removable storage devices, and non-removable storage devices. Computer-readable media includes random access memory (RAM), read-only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The term "computer-readable medium" excludes signals per se.

The transceivers 410 may be coupled to the downstream ports 420 (e.g., downstream interfaces) for transmitting and/or receiving frames from other nodes, and the other transceivers 410 may be coupled to the multiple upstream ports 450 (e.g., upstream interfaces) for transmitting and/or receiving frames from other nodes, respectively. A processor 430 may be coupled to the transceivers 410 to process the data signals and/or to determine which network nodes 108/110 to send data signals to. The processor 430 is coupled to memory 440 which may include one or more memory devices that may function as program stores, data stores, buffers, etc. Processor 430 may be implemented as a single-core or multi-core processor or may be part of one or more Graphics Processing Units (GPUs), Network Processor Units (NPUs), application-specific integrated circuits (ASICs), and/or digital signal processors (DSPs). In some embodiments, the network device 400 may comprise a self-driving packet module 432, configured to receive and process data packets 102 that include conditional commands. The self-driving packet module 432 obtains conditional commands from a data packet and determines whether a condition in the conditional command is satisfied based on packet header data, data stored in memory 440, and/or based on associated parameters in the conditional command. Upon determining that the condition is satisfied, the self-driving packet module 432 executes the conditional command. Such a command may cause the self-driving packet module 432 to modify the packet header; modify flow context including changing the path to a destination node based on an assessment of a level of deterioration of one or more links on a network path to a destination node; modify routing commands; and/or perform other actions to the data packet 102 and/or the corresponding data flow 112.

The self-driving packet module 432 may be implemented as part of processor 430 such as commands stored in the memory 440 (e.g., as a computer program product), which may be executed by processor 430, and/or implemented one part in processor 430 and another part in memory 440.

Although the example computing device is illustrated and described as a network node 108/110, the computing device may be in different forms in different embodiments. For example, a different computing device may implement a host node 106, such as a smartphone, a tablet, a smartwatch, or another computing device including the same or similar elements as illustrated and described with regard to FIG. 4, above, or FIG. 10, below. Devices, such as smartphones, tablets, and smartwatches, are generally collectively referred to as mobile devices or user equipment (UE). Further, although the various data storage elements are illustrated as part of the network device 400, the storage may also include cloud-based storage accessible via a network, such as the Internet or server-based storage.

The network device 400 may include or have access to a computing environment that includes an input interface, an output interface, and a communication interface. The output interface may include a display device, such as a touchscreen, that also may serve as an input device. The input interface may include one or more of a touchscreen, touchpad, mouse, keyboard, camera, one or more device-specific buttons, one or more sensors integrated within or coupled via wired or wireless data connections to the network device 400, and/or other input devices. The network device 400 may operate in a networked environment using a communication connection to couple to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks.

In example embodiments, the network domain 104 can implement a Big Packet Protocol (BPP) network that uses conditional commands to route the data packets 102. New IP Packets, shown in FIG. 5, can also hold conditional commands. Other variations on IP protocols can also be combined with the concepts described herein. Such conditional commands executed by the edge nodes 108 and/or the internal nodes 110 manage other actions related to the network domain 104 and/or to data flows 112. These actions may include, without limitation, monitoring the status of links that node 108 or 110 is connected to, updating the context of a data flow 112, directing maintenance of statistics related to the data flow 112, and/or updating metadata and headers of packets 102. Hence, the conditional commands may be used to direct how the packets 102 of the flow should be routed (e.g., self-driving). This network control is implemented by nodes 108 and 110 executing the conditional commands based on metadata in the commands and the status of the network links. In some embodiments, a conditional command is inserted in the header of packet 102 by the edge node 108 acting as an ingress node (e.g., the head-end node). The command may be generated by the edge node or provided to the edge node by the network controller 120 through the control plane. The conditional command includes a condition, a command, and may also include one or more parameters. The condition indicates an item that must be satisfied before the command (within the conditional command) is executed. When the condition is not met, the command is ignored. The command indicates an action or actions to be taken by the node processing the data packet 102 upon the occurrence of the condition.

In one example, one of the host nodes 106 may communicate with one of the edge nodes 108 to set up a communication session. The host node 106 may express communication SLOs to edge node 108. Alternatively, the communication can be inherent, namely, based on some parameters of the data packet, such as the source IP address. The edge node 108 can determine what kind of treatment a data packet has to be given in the network domain 104 and generate conditional commands accordingly. The ingress edge node 108 can then generate one or more conditional commands based on the one or more SLOs of the application and append the conditional commands as sub-packets in one or more of the data packets 102 of the data flow 112 as such packets 102 enter the network domain 104.

Figure 5:
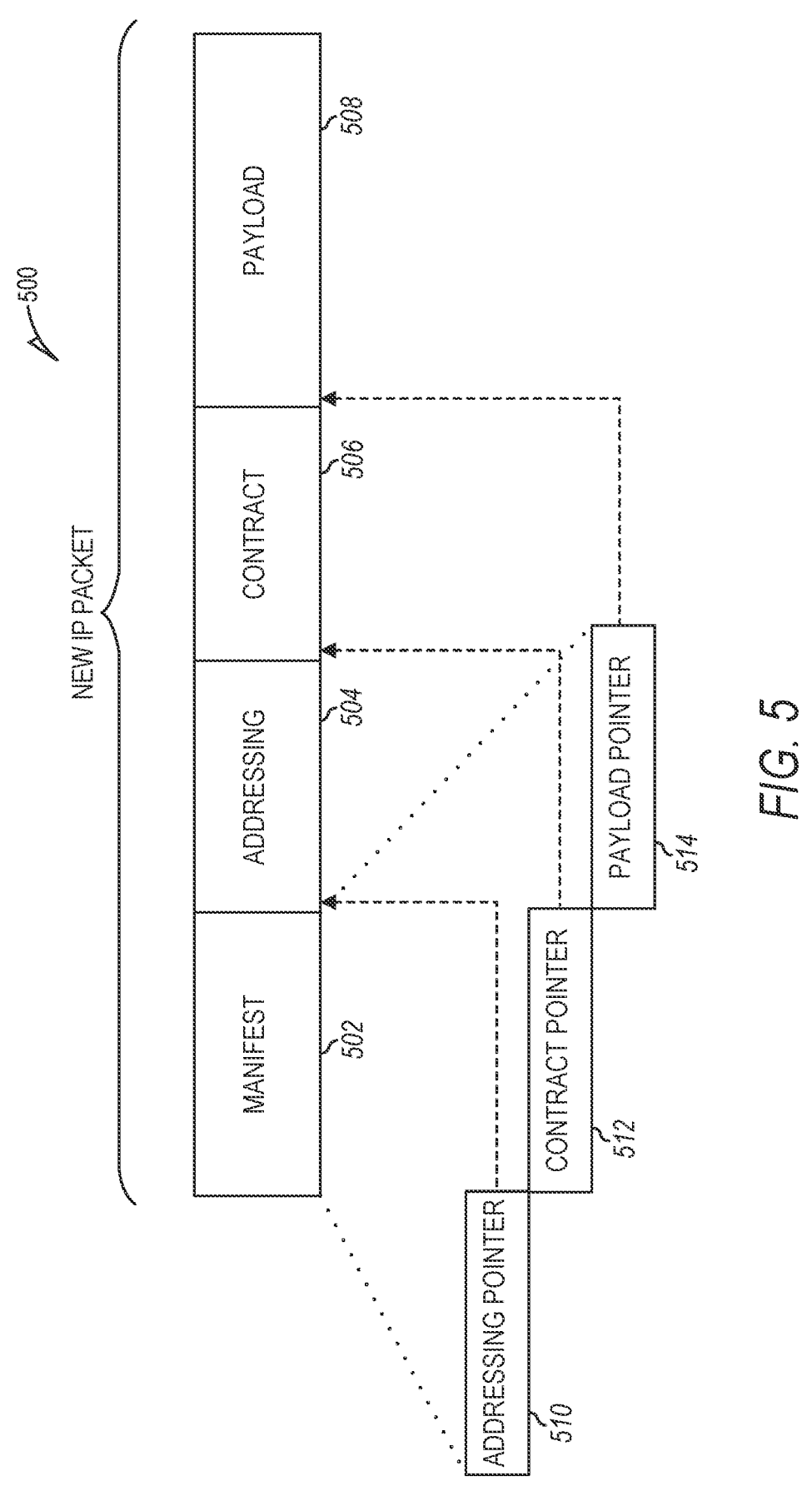
FIG. 5 is a data diagram of an example New IP Packet that can be employed to implement self-routing packets according to an example embodiment.

FIG. 5 is a data diagram of an example New IP Packet 500 that can be employed to implement the self-routing packets 102 according to an example embodiment. The New IP Packet 500 is described in an article by R. Li, et al. dated May 22, 2020, and entitled "New IP: A Data Packet Framework to Evolve the Internet, Invited Paper," 2020 IEEE 21$^{st}$ International Conference on High-Performance Switching and Routing (HPSR), and is incorporated by reference herein in its entirety. The New IP Packet 500 includes a manifest segment 502, an addressing segment 504, a contract segment 506, and a payload segment 508. The manifest segment includes an addressing pointer 510 that points to the start of the addressing segment 504, a contract pointer 512 that points to the start of the contract segment 506, and a payload pointer 514 that points to the start of the payload segment 508. The addressing segment allows a free choice of addressing protocols including, without limitation, Internet Protocol version 4, (IPv4), Internet Protocol version 6 (IPv6), and/or Locator ID Separation Protocol (LISP). In some examples, the addressing segment 504 includes the sequence of node addresses for routing the packets 102 of the data flows 112 through the network domain 104 along the primary path.

The contract segment 506 includes the SLA and/or SLO and may include conditional commands that can be used for determining whether a link in the sequence of node addresses contained in the addressing segment 504 is exhibiting non-congestion-related loss. Besides, the conditional commands may be used for determining whether the packet is to be re-routed (e.g., based on whether the condition of the conditional command is satisfied) and control the re-routing (e.g., based on the execution of the command within the conditional command). Since multiple node addresses may be included in the addressing segment 504, the determination of a non-congestion-related loss may be performed in connection with one or more links after the current location of the packet.

The SLA/SLO may specify, without limitation, in-time guarantees, on-time guarantees, and lossless networking, for example, via Equal Cost Multi-Path (ECMP) routing. The conditional commands may determine whether the SLA/SLO describes a service level appropriate for re-routing the data flow around the link exhibiting the non-congestion-related loss. The conditional commands may also compare the determined loss to a threshold to determine whether the packet should be re-routed around the link. Thus, the New IP Packet 500 may be used to implement a self-driving packet network.

Although example packets 102 conform to the New IP Packet protocol, other embodiments may use packets 102 that conform to a BPP packet format. BPP packets include an Ethernet Frame, a BPP header including a pseudo-header specifying IPv4 or IPv6, one or more BPP blocks, and a payload. Each BPP block includes a BPP header, a command block, and a metadata block. The command block includes conditional commands that may reference parameters in the metadata block. The metadata block may also specify the SLA/SLO for the data flow 112 for the packets 102.

In another embodiment (e.g., as used in an IPv6 network), the conditional commands are inserted into a newly-defined extension header or a newly-defined hop-by-hop options header of the IPv6 packets. Extension headers and hop-by-hop options headers are described in RFC 8200, entitled "Internet Protocol, Version 6 (IPv6) Specification" which is incorporated by reference herein in its entirety.

In example embodiments, when the data packet 102 is created, a bit is set within the packet to specify whether the conditional command in the sub-packet can be concurrently processed or is dependent upon the processing of other commands. In another example, a network provider may determine to inject conditional commands as sub-packets into the data packets 102 at the edge node(s) 108 without a request from the host node(s) 106. For example, the network provider may add conditional commands to determine whether the next link in the path for a packet is exhibiting non-congestion-related losses that are greater than a threshold and conditional commands to re-route the packet toward the destination node by an alternative path (for example, when the next link has the losses). Using conditional commands, packet flows may be re-routed entirely in the data plane, without the involvement of the network controller 120. Thus, the network domain 104 may be implemented without a separate control plane.

The internal nodes 110 obtain the conditional commands from the contract segment 506 of packets 102 during routing. The internal nodes 110 may store routing commands for each data flow 112 to reduce the number of packets that contain commands. Such routing commands may include commands to determine whether a link exhibits non-congestion-related loss. Also, the commands may determine whether the link exhibits congestion-related loss such as excessive queue length or reduced bandwidth. The routing commands also generate and/or use data that is specific to the routing of the data flow 112 and/or to general routing commands, such as policies of the network domain 104, IP routing commands, SR commands, PPR routing commands, Cisco Performance Routing (PfR) commands, media access control (MAC) routing commands, multi-protocol label switching (MPLS) routing commands, and/or other routing commands commonly employed for routing packets 102 via a network domain 104. The routing commands obtain non-congestion-related loss data and, optionally, congestion-related loss data for the entire path and/or for the individual links and nodes. As described below with reference to FIGS. 8 and 9, nodes 110 and/or 108 use the non-congestion-related loss data and, optionally, the congestion-related loss data to conditionally re-route the data flow 112 to an alternative path including links and nodes that exhibit better performance.

Figure 6:
FIG. 6 is a flowchart of a method for processing self-routing commands according to an example embodiment.

FIG. 6 is a flowchart of method 600 for processing self-routing commands according to an example embodiment. In operation 602, node 110 or 108 receives a packet 102 that includes one or more conditional commands. Method 600, at operation 610, determines whether any of the conditional commands is unprocessed. When the packet includes at least one unprocessed command, method 600, at operation 612 retrieves the unprocessed command and, at operation 614, determines whether any condition or conditions for the conditional command are satisfied. When the conditional command has an unsatisfied condition, method 600 skips over the command and branches to operation 610 to determine if the packet includes any other unprocessed conditional commands. When, at operation 614, the condition or conditions have been satisfied, method 600 executes the command (associated with the conditional command) in operation 616 and branches back to operation 610. When method 600, at operation 610, determines that all of the commands have been processed, method 600 branches to operation 618 which performs any further processing on the packet and dispatches the packet to the next link on the path. The next link is on the primary path when the execution of the commands at operation 616 does not result in switching to an alternate path, or the next link on the alternate path when the execution of the commands at operation 616 does result in switching to the alternate path.

Figure 7:
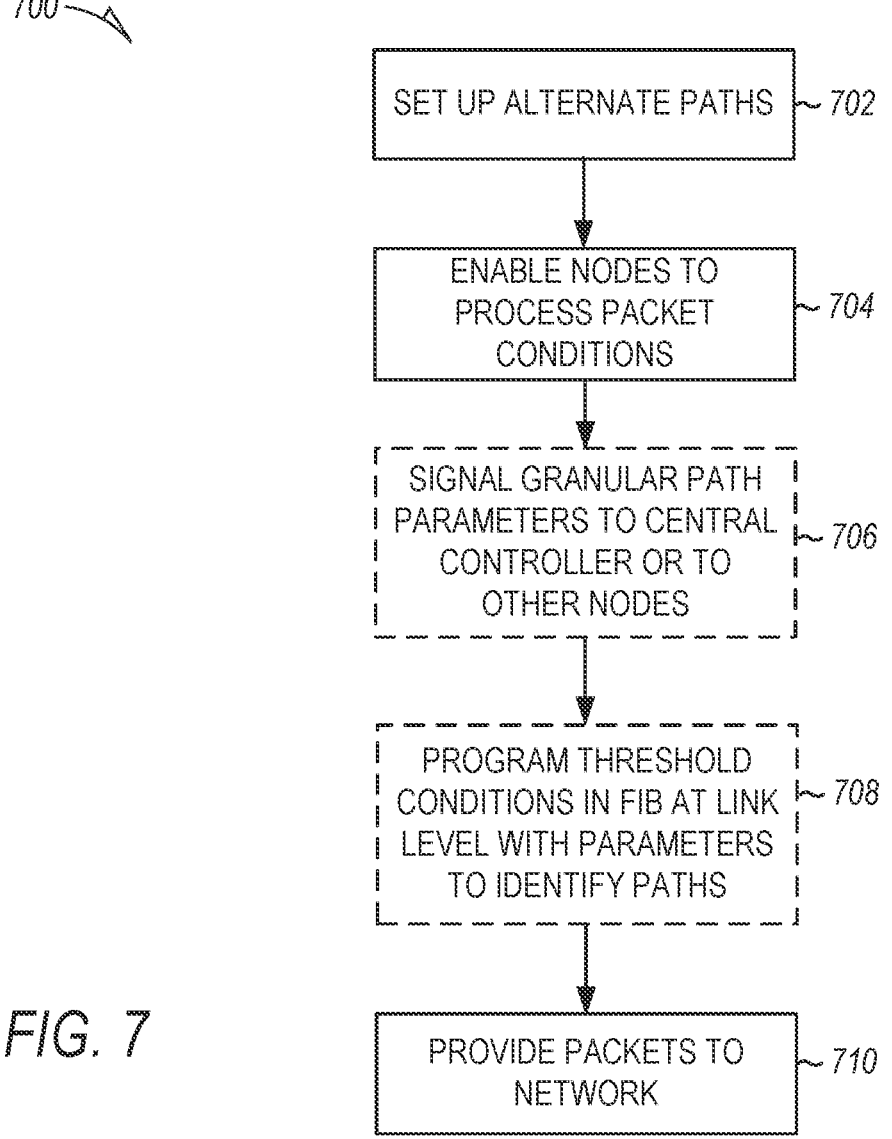
FIG. 7 is a flowchart of a method for preparing a network to process self-routing packets of a data flow according to an example embodiment.

FIG. 7 is a flowchart of method 700 for preparing a network to process self-routing packets 102 of a data flow 112 according to an example embodiment. In some embodiments, the functionalities associated with method 700 may be performed by a network configuration node (e.g., network device 400) within the network 100, which may be a host node 106, an edge node 108, or an internal node 110. The self-routing packets conditionally change the path of the packets 102 through the network domain 104 in response to detected non-congestion path deterioration. At operation 702, method 700 sets up a primary path and alternate paths for the data flow 112. In example embodiments, when the data flow 112 is a TE data flow, the primary path may be determined using SR, PfR, and/or PPR and the alternate paths may be determined using FRR, PPR LFA, and/or TI LFA FRR. The alternative paths for a TE primary path satisfy the SLA/SLO of the TE data flow. When data flow 112 is a BE data flow, the primary path may be determined using OSPF or IS-IS and the alternate paths may be determined using LFA/RLFA and/or IP FRR. At operation 704, method 700 enables the nodes to process the packet conditions. In an example embodiment, method 700 may store the primary path and one or more of the determined alternate paths in the contract segment of packet 102 when the data flow 112 uses New IP Packet or in the metadata block of the BPP block when the data flow 112 uses BPP packets.

Optionally, method 700, at operation 706, may add conditional commands that cause the nodes 108 and/or 110 to notify each other and/or the network controller 120 of non-congestion-related loss encountered during packet routing. These commands may cause the other nodes 108 and/or 110 and/or network controller 120 to notify each other of any non-congestion-related loss or of non-congestion-related losses that exceed the thresholds in the conditional commands. As described above concerning FIG. 3B, the nodes 108 and/or 110 send TLV records describing the non-congestion losses to the other nodes using IGP or to the network controller 120 either directly through the control plane or to the edge nodes 108 using IGP and then to the network controller 120 via control plane coupling. At optional operation 708, method 700 programs the threshold conditions for the paths in the FIB at the link level with parameters to identify each path. Once the packets 102 have been provisioned and/or the FIB has been initialized, method 700, at operation 710, provides the packets 102 to the network domain 104 for transmission to one or more host nodes 106 using the primary path among the edge nodes 108 and internal nodes 110.

Figure 8:
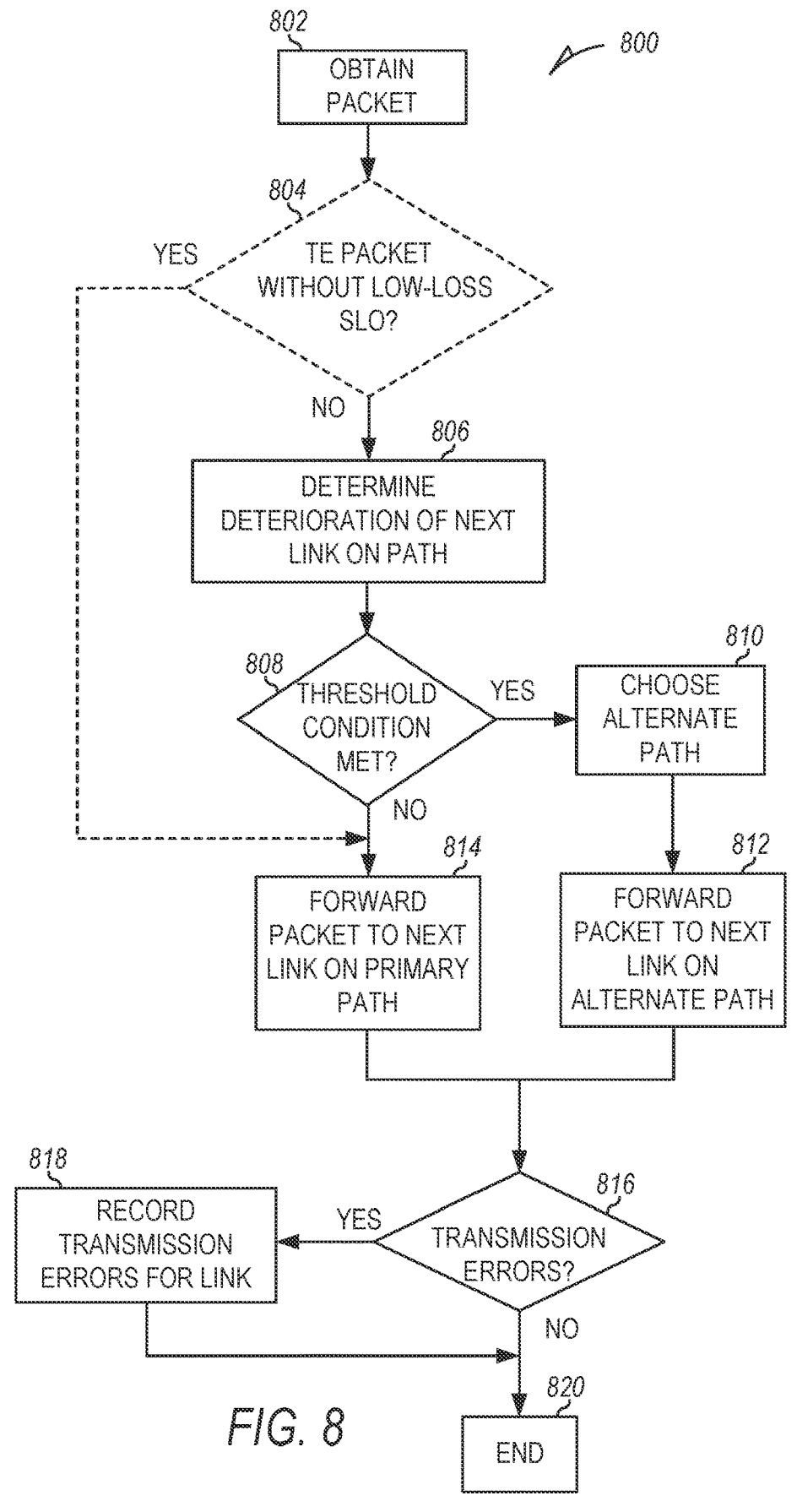
FIG. 8 is a flowchart of a method for determining link deterioration and conditionally routing a packet around the deteriorated link according to an example embodiment

FIG. 8 is a flowchart of method 800 for detecting link deterioration and conditionally routing a packet 102 around the deteriorated link according to an example embodiment. Method 800 obtains the packet at operation 802. In some embodiments, the obtained packet 102 includes the conditional routing commands for a data flow 112. Each packet in the data flow may include its conditional routing commands or the first packet 102 in the data flow may include the conditional routing commands for the data flow 112. When all of the packets include the commands, the nodes 108 and/or 110 may execute the conditional routing commands once to re-route the data flow 112. When only the first packet includes the commands, the nodes 108 and/or 110 may store the conditional routing commands in memory 440, shown in FIG. 4, and execute the conditional commands for each packet 102 in the data flow 112. In other embodiments, the commands to implement method 800 may not be in the packets but may be provided to the nodes 108 and/or 110 via the control plane, either by direct coupling to the network controller 120 or through an IGP communication from the edge node 108 that initiated the data flow 112.

At optional operation 804, method 800 determines whether the packet is from a TE data flow that does not have a low packet loss SLO. This operation is optional as method

800 may re-route all TE packets around links and/or nodes experiencing non-congestion-related loss or may re-route only TE packets having a low packet loss SLO. According to the optional operation 804, when the TE packet does not have a low packet loss SLO, method 800 routes the TE packet through the next link in the primary path by branching to operation 814. As used herein, the term "low packet loss SLO" (or "low loss SLO") refers to a Service Level Objective that mandates (or requires) a certain level of packet loss during data communication within a network. In this regard, packet loss that is above the level indicated by the SLO can be considered unacceptable and remediation measures may be performed (e.g., applying one or more of the disclosed techniques to re-route data traffic).

The normal flow for method 800 re-routes all TE and BE packets around deteriorated links/nodes in the primary path to an alternate path. Accordingly, packets obtained by operation 802 are provided to operation 806 by which method 800 determines the level of deterioration on the next link in the path. Operation 806 is described in more detail below with reference to FIG. 9. Although FIG. 8 shows optional operation 804 is performed before operation 806, it is contemplated that operation 804 may be performed after operation 806. In this configuration, the condition of the primary path is always checked regardless of the SLO of the packets. This has the advantage of advertising detected path deterioration for all routing decisions.

In some embodiments, to avoid oscillation of paths during which the path constantly changes (e.g., when the loss oscillates around a threshold), additional techniques may be applied such as not reassessing the threshold crossing for a certain amount of time after an alternate path is chosen, or maintaining a "counter threshold" that would need to be crossed in the opposite direction until packets might go back to the original path. In this regard, method 800 may utilize a timer for a "grace period" that is reset whenever the alternate path is selected, then not reassessed during operation 804 until the timer expires.

Method 800 then compares the level of deterioration to one or more thresholds in operation 808. As described below with reference to FIG. 9, link deterioration includes non-congestion-related loss but may also include congestion-related loss. Also, there may be multiple types of non-congestion-related loss and congestion-related loss. Thus, in operation 808, method 800 may compare each type of non-congestion-related loss to a respective threshold, may combine non-congestion-related losses and compare the combined losses to a threshold, or may combine both the non-congestion-related losses and the congestion-related losses before comparing the combined losses to the (combined) threshold. The threshold value may take many different forms depending on the type of loss. It may be, without limitation, a BER threshold value, several seconds having bit-errors, a percentage of packets having bit errors, or a value derived from a mathematical combination of these values. When method 800 determines that the threshold condition has not been met, it forwards the packet to the next link on the primary path as shown in operation 814.

When method 800 determines that the threshold condition has been met, it selects an alternate path for the packet at operation 810 based on the stored alternate path data. This data may indicate multiple paths and loss metrics for each of the multiple paths. These metrics may be maintained by each node 108 or 110 based on IGP messages received from other nodes. Alternatively, the metrics may be maintained by the network controller 120 and provided to nodes 108 and 110 via the control plane. For TE data flows 112, method 800 selects an alternate path that satisfies the one or more SLOs for the data flow 112. For BE data flows 112, method 800 selects the shortest alternate path. At operation 812, method 800 forwards the packet to the next link on the selected alternate path.

When both the primary path and the alternate path exhibit non-congestion-related losses, method 800 may switch back and forth between the two paths. As each switch may cause its loss, method 800 may further control the switching between the primary and alternate paths to mitigate oscillation between the primary and alternate paths. One method may modify operation 808 to inhibit path switching when the current path has been in use for less than a set period. Another method may implement hysteresis such that the node compares the non-congestion-related loss of the primary path link to the non-congestion-related loss of the alternate path and allows a path switch when the difference between the two losses is greater than a threshold. Another method for inhibiting path oscillation may be to use a higher threshold when switching from the alternate path back to the primary path than was used to switch from the primary path to the alternate path. Method 800 may use the original threshold or the higher threshold for switching from the alternate path to a second alternate path.

After operation 812 or operation 814, method 800, at operation 816, monitors the transmitted packet to determine if it encountered transmission errors. When such errors are detected, method 800 records the transmission errors at operation 818. These transmission errors may be consolidated over time to provide the non-congestion-related loss for the link. Method 800 ends at operation 820 after operation 818 or when no transmission errors are detected at operation 816.

Figure 9:
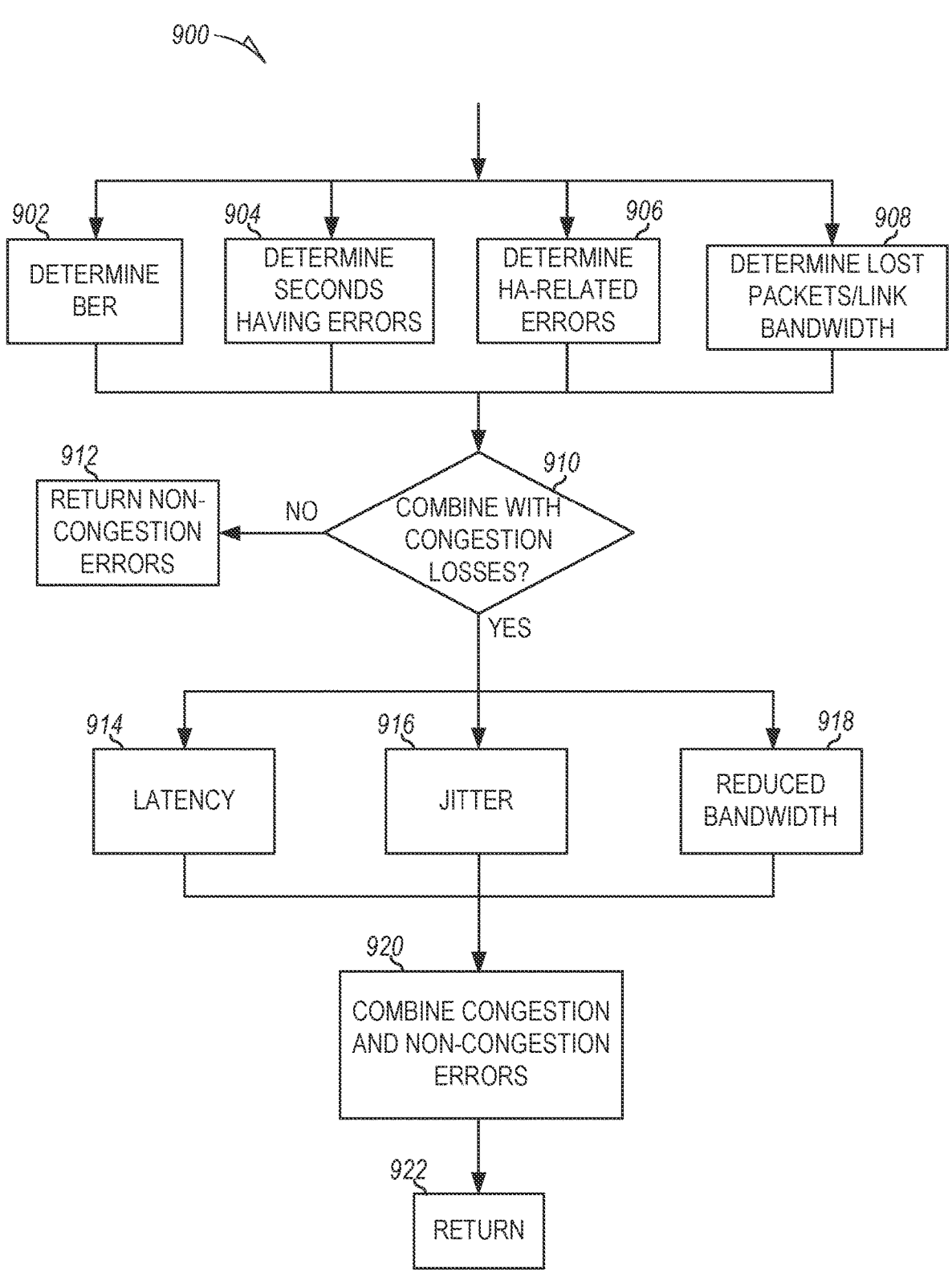
FIG. 9 is a flowchart of a method for determining link deterioration according to an example embodiment.

FIG. 9 is a flowchart of method 900 for determining link deterioration according to an example embodiment. Method 900 corresponds to operation 806 of FIG. 8 and ascertains whether a link to the next node in the current path exhibits non-congestion-related loss and, optionally, congestion-related loss.

The non-congestion-related loss may be the result of Cyclic Redundancy Check (CRC) errors, High Availability (HA) errors such as packet loss due to a line-card being rebooted, packet loss due to synchronization issues between the control plane and data plane, hardware errors, and/or environmental conditions. Environmental conditions primarily affect wireless, microwave, and satellite links and may include rain-fade, cloud cover, or loss of line of sight. Wireless, microwave, or satellite links may also experience a non-congestion loss due to Radio Frequency Interference (RFI). Non-congestion losses can also occur in 5G network components implementing front-haul and mid-haul processes. Front-haul non-congestion-related losses occur at layer L2. Non-congestion-related losses can also occur due to hardware issues at layer L1. Optical or wired electrical links may experience a loss due to physical link deterioration, for example, a hot optical link or RFI for an electrical link to a line card. Hardware errors may also occur at the chip level, for example, when data processed by the chip is corrupted due to cosmic rays. Hardware issues, however, may cause link deterioration for all types of links.

Non-congestion-related losses may be detected using the One-Way Active Measurement Protocol (OWAMP), as described in RFC 4656; Two-Way Active Measurement Protocol (TWAMP), as described in RFC 5357; and/or Cisco® Internet Protocol Service Level Agreements (IP SLA). OWAMP and TWAMP send probe packets through the network and receive measurement packets from each node along the path. A node employing OWAMP or TWAMP to detect non-congestion-related loss may use one or more responder applications (e.g. session reflectors) at the intermediate and/or destination nodes along the path to return the collected loss measurements for the other nodes in the path. The data returned by the other nodes may include chip-level statistics collected at each node. As described above, node 108 or 110 can detect a non-congestion-related loss by monitoring transmissions through its links. When a node receives a negative acknowledgment (NAK) indicating transmission errors, it can add data about the errors to loss statistics for the link. A packet that is corrupted during transmission produces an erroneous CRC or an erroneous checksum. Depending on the error checking/correcting system that is used, the recipient may inform the sender of several bit errors detected by the CRC. Alternatively, the NAK may indicate a failed packet transmission. The network domain 104 may maintain link-level statistics at a forwarding layer including, without limitation, the number of bit errors, number of corrupted packets, BER, number of seconds in which bit errors occur per hour, per day, per week, per month, or per year. These statistics may be maintained by the network controller 120 or shared among nodes 108 and 110 via IGP.

The non-congestion-related loss does not result in link failure because data may still flow through the link although the errors may result in more overhead due to error correction and/or retransmission of failed packets. Furthermore, the non-congestion-related loss may result in a reduction in the bandwidth of a link. Method 900 dynamically detects these errors and provides an indication of the detected errors to operation 808 of method 800 as described above.

In FIG. 9, method 900 measures non-congestion-related losses as BER (at operation 902), determines seconds having bit-errors (at operation 904), determines the number of HA-related errors (at operation 906), and/or determines the number of lost packets divided by the link bandwidth (at operation 908). These losses are illustrative. Method 900 may measure other non-congestion-related losses as described above. Method 900 determines, at operation 910, whether the measured non-congestion-related losses are to be combined with congestion-related losses. When the non-congestion-related losses are not to be combined with the congestion-related losses, method 900, at operation 912, passes the non-congestion-related losses to operation 808 of method 800. When the non-congestion-related losses are to be combined with the congestion-related losses, method 900, at operation 910, branches to operations which determine packet latency (operation 914), packet jitter (operation 916), and reduced bandwidth (operation 918). At operation 920, method 900 combines congestion-related losses with non-congestion-related losses and, at operation 922, passes the combined losses to operation 808 of method 800.

Figure 10:
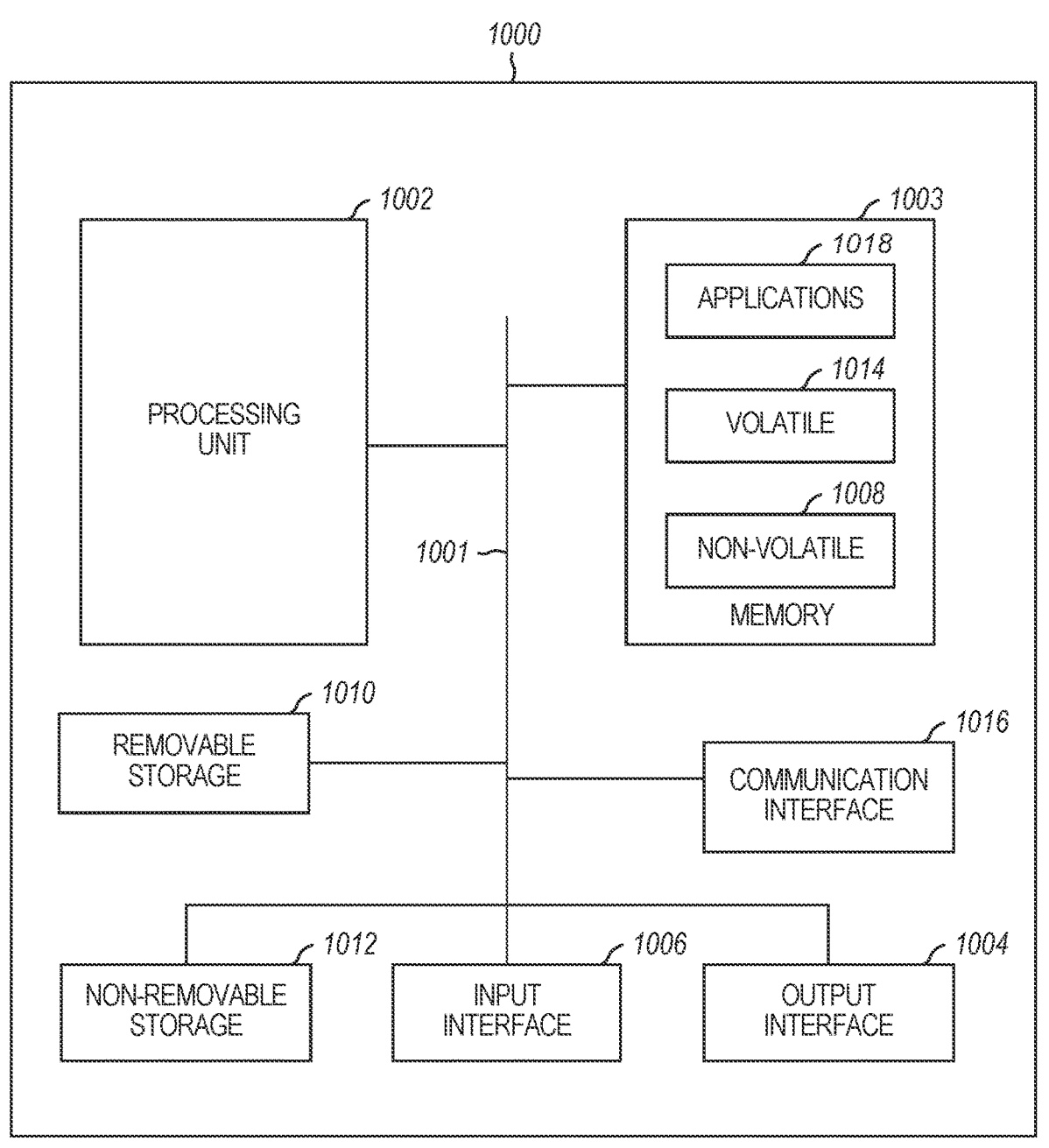
FIG. 10 is a diagram of a computing device according to an embodiment.

FIG. 10 is a diagram of a computing device 1000 according to an embodiment. Similar components may be used in the example computing devices described herein. Computing devices similar to computing device 1000 may be used as an alternative to the host nodes 106, edge nodes 108, and/or internal nodes 110. When used for an edge node 108 or internal node 110, the computing device 1000 may not include all of the elements shown in FIG. 10.

One example computing device 1000 may include a processing unit (e.g., one or more processors and/or CPUs) 1002, memory 1003, removable storage 1010, and non-removable storage 1012 communicatively coupled by a bus 1001. Although the various data storage elements are illustrated as part of the computing device 1000.

Memory 1003 may include volatile memory 1014 and non-volatile memory 1008. Computing device 1000 may include or have access to a computing environment that includes a variety of computer-readable media, such as volatile memory 1014 and a non-volatile memory 1008, removable storage 1010, and non-removable storage 1012. Computer storage includes random access memory (RAM), read-only memory (ROM), erasable programmable read-only memory (EPROM), electrically erasable programmable read-only memory (EEPROM), flash memory or other memory technologies, compact disc read-only memory (CD-ROM), digital versatile disk (DVD) or other optical disk storage devices, magnetic cassettes, magnetic tape, magnetic disk storage or other magnetic storage devices, or any other medium capable of storing computer-readable instructions. Memory 1003 also includes program instructions for applications 1018 that implement any of the methods and/or algorithms described above.

Computing device 1000 may include or have access to a computing environment that includes an input interface 1006, an output interface 1004, and a communication interface 1016. Output interface 1004 may provide an interface to a display device, such as a touchscreen, that also may serve as an input device. The input interface 1006 may provide an interface to one or more of a touchscreen, touchpad, mouse, keyboard, camera, one or more device-specific buttons, one or more sensors integrated within or coupled via wired or wireless data connections to the server computing device 1000, and/or other input devices. The computing device 1000 may operate in a networked environment using a communication interface 1016. The communication interface may include one or more of an interface to a local area network (LAN), a wide area network (WAN), a cellular network, a wireless LAN (WLAN) network, and/or a Bluetooth® network.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various embodiments, modules described herein as being implemented within a single machine, database, or device may be distributed across multiple machines, databases, or devices. As described herein, a module can comprise one or both of hardware or software that has been designed to perform a function or functions (e.g., one or more of the functions described herein in connection with providing secure and accountable data access).

Although a few embodiments have been described in detail above, other modifications are contemplated and are within the scope of this description and claims. For example, the logic flows depicted in the FIGS. 6, 7, 8, and/or 9 do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above concerning any one or all of the steps of the disclosure can be installed in and provided with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Also, the terms "connected" and "coupled" and variations thereof are not restricted to physical or mechanical connections or couplings.

The components of the illustrative devices, systems, and methods employed by the illustrated embodiments can be implemented, at least in part, in digital electronic circuitry or computer hardware, firmware, software, or in combinations of them. These components can be implemented, for example, as a computer program product such as a computer program, program code, or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, method, object, or another unit suitable for use in a computing environment. A computer program can be deployed to run on one computer or multiple computers at one site or distributed across multiple sites and interconnected by a communication network. Method steps associated with the illustrative embodiments can be performed by one or more programmable processors executing a computer program, code, or instructions to perform functions (e.g., by operating on input data and/or generating an output). Method steps can also be performed by, and the apparatus for performing the methods can be implemented as, special-purpose logic circuitry, for example, as an FPGA (field-programmable gate array) or an ASIC (application-specific integrated circuit), for example.

The various illustrative logical blocks, modules, and circuits described in connection with the embodiments disclosed herein, for example, the network device 400, shown in FIG. 4, may be implemented or performed with one or more general-purpose processors, a digital signal processor (DSP), an ASIC, an FPGA and/or another programmable logic device, discrete gate or transistor logic, discrete hardware components, or any combination thereof designed to perform the functions described herein. A general-purpose processor may be a single-core or multi-core microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Processors suitable for the execution of a computer program include, by way of example, both general-purpose and special-purpose microprocessors, and any one or more processors of any kind of digital computer. Generally, a processor will receive instructions and data from a read-only memory or a random-access memory, or both. The elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, for example, electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated into special-purpose logic circuitry.

Those with skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" or "computer-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" or "computer-readable medium" should be taken to include a single medium or multiple media (e.g., a centralized or distributed database, or associated caches and servers) able to store processor instructions. A machine-readable medium or computer-readable medium shall also be taken to include any medium (or a combination of multiple media) that is capable of storing instructions for execution by one or more processors, such that the instructions, when executed by one or more processors, cause the one or more processors to perform any one or more of the methodologies described herein. Accordingly, a machine-readable medium or computer-readable medium refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described concerning features and embodiments thereof, it is evident that various modifications and combinations can be made thereto without departing from the scope of the disclosure. For example, other components may be added to, or removed from, the described methods, modules, devices, and/or systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for conditionally routing a data packet in a network node, the computer-implemented method comprising:

determining a level of deterioration of a primary path between the network node and a destination node, the determined level of deterioration based at least on a non-congestion-related loss for a primary link associated with one or more subsequent hops of the data packet from the network node towards the destination node along the primary path;

parsing the data packet to determine a threshold; and comparing the determined level of deterioration of the primary path to the threshold, and based on the determined level of deterioration of the primary path being above the threshold:

changing the primary path to an alternate path from the network node to the destination node; and forwarding the data packet to a next network node on the alternate path, wherein:

the data packet includes a conditional command specifying at least a condition and a command;

the condition specifying the threshold for the level of deterioration of the primary path; and the command specifying the changing of the primary path to the alternate path when the determined level of deterioration of the primary path is above the threshold.

2. The computer-implemented method of claim 1, wherein:

the determining the level of deterioration of the primary path includes determining a non-congestion-related loss for a next link associated with a next hop of the one or more subsequent hops of the data packet along the primary path; and the changing the primary path to the alternate path includes:

changing the next link in the primary path to a next link in the alternate path; and forwarding the data packet to the next link in the alternate path.

3. The computer-implemented method of claim 2, wherein the next link associated with the next hop is directly coupled to the network node, and wherein:

the determining the level of deterioration of the primary path includes determining the non-congestion-related loss for a remote link along the primary path, the remote link being at least one hop away from the next link; and the changing the primary path to the alternate path includes:

changing the next link in the primary path to a next link in the alternate path based on the non-congestion-related loss for the remote link; and forwarding the data packet to the next link in the alternate path.

4. The computer-implemented method of claim 3, wherein the changing the next link in the primary path to the next link in the alternate path includes:

determining the non-congestion-related loss for the next link in the alternate path; and changing the next link in the primary path to the next link in the alternate path when the next link in the alternate path exhibits less non-congestion-related loss than the next link in the primary path.

5. The computer-implemented method of claim 4, wherein the determining the non-congestion-related loss in the next link in the alternate path includes:

sending, by the network node, a probe packet to the destination node using the alternate path; and determining a measure of non-congestion-related loss of the next link of the alternate path based on a response to the probe packet received from the destination node.

6. The computer-implemented method of claim 5, wherein the determining the non-congestion-related loss for the next link in the alternate path or the next link in the primary path includes determining a bit error rate (BER).

7. The computer-implemented method of claim 1, further comprising notifying a network controller of the non-congestion-related loss.

8. The computer-implemented method of claim 7, further comprising:

determining a measure of congestion-related loss for the primary path; and notifying the network controller of the measure of the congestion-related loss.

9. The computer-implemented method of claim 1, wherein the changing the primary path to the alternate path further includes determining that a service requirement for the data packet indicates a performance level that is greater than a second threshold.

10. The computer-implemented method of claim 1, wherein the primary path is a traffic-engineered (TE) path conforming to at least one service level objective (SLO), and the alternate path is a pre-provisioned alternate TE path conforming to the SLO of the primary path.

11. The computer-implemented method of claim 1, wherein the primary path is a best-effort (BE) path, and the alternate path is a loop-free alternative (LFA) path, remote loop-free alternative (RLFA) path, or an Internet protocol fast reroute (IP FRR) path.

12. The computer-implemented method of claim 1, wherein the changing the primary path to the alternate path is based on execution of the command.

13. A system for conditionally routing a data packet in a network node, the system comprising:

a memory storing instructions; and at least one processor in communication with the memory, the at least one processor configured, upon execution of the instructions, to perform the following steps:

determining a level of deterioration of a primary path between the network node and a destination node, the determined level of deterioration based at least on a non-congestion-related loss for a primary link associated with one or more subsequent hops of the data packet from the network node towards the destination node along the primary path;

parsing the data packet to determine a threshold; and comparing the determined level of deterioration of the primary path to the threshold, and based on the determined level of deterioration of the primary path being above the threshold:

changing the primary path to an alternate path from the network node to the destination node; and forwarding the data packet to a next network node on the alternate path, wherein:

the data packet includes a conditional command specifying at least a condition and a command;

the condition specifying the threshold for the level of deterioration of the primary path; and the command specifying the changing of the primary path to the alternate path when the determined level of deterioration of the primary path is above the threshold.

14. The system of claim 13, wherein:

the determining the level of deterioration of the primary path includes determining a non-congestion-related loss for a next link associated with a next hop of the one or more subsequent hops of the data packet along the primary path; and the changing the primary path to the alternate path includes:

changing the next link in the primary path to a next link in the alternate path; and forwarding the data packet to the next link in the alternate path.

15. The system of claim 14, wherein the next link associated with the next hop is directly coupled to the network node and wherein:

the determining the level of deterioration of the primary path includes determining the non-congestion-related loss for a remote link along the primary path, the remote link being at least one hop away from the next link; and the changing the primary path to the alternate path includes:

changing the next link in the primary path to a next link in the alternate path based on the non-congestion-related loss for the remote link; and forwarding the data packet to the next link in the alternate path.

16. The system of claim 15, wherein:

the changing the next link in the primary path to the next link in the alternate path includes:

determining the non-congestion-related loss for the next link in the alternate path; and changing the next link in the primary path to the next link in the alternate path when the next link in the alternate path exhibits less non-congestion-related loss than the next link in the primary path; and the determining the non-congestion-related loss in the next link in the alternate path includes:

sending, by the network node, a probe packet to the destination node using the alternate path; and determining a measure of non-congestion-related loss of the next link of the alternate path based on a response to the probe packet received from the destination node.

17. A non-transitory computer-readable media storing computer instructions for conditionally routing a data packet in a network node, that configure at least one processor, upon execution of the instructions, to perform the following steps:

determining a level of deterioration of a primary path between the network node and a destination node, the determined level of deterioration based at least on a non-congestion-related loss for a primary link associated with one or more subsequent hops of the data packet from the network node towards the destination node along the primary path;

parsing the data packet to determine a threshold; and comparing the determined level of deterioration of the primary path to the threshold, and based on the determined level of deterioration of the primary path being above the threshold:

changing the primary path to an alternate path from the network node to the destination node; and forwarding the data packet to a next network node on the alternate path, wherein:

the data packet includes a conditional command specifying at least a condition and a command;

the condition specifying the threshold for the level of deterioration of the primary path; and the command specifying the changing of the primary path to the alternate path when the determined level of deterioration of the primary path is above the threshold.

18. The non-transitory computer-readable media of claim 17, wherein:

the determining the level of deterioration of the primary path includes determining a non-congestion-related loss for a next link associated with a next hop of the one or more subsequent hops of the data packet along the primary path; and the changing the primary path to the alternate path includes:

changing the next link in the primary path to a next link in the alternate path; and forwarding the data packet to the next link in the alternate path.

19. The non-transitory computer-readable media of claim 18, wherein the next link associated with the next hop is directly coupled to the network node, and wherein:

the determining the level of deterioration of the primary path includes determining the non-congestion-related loss for a remote link along the primary path, the remote link being at least one hop away from the next link;

the changing the primary path to the alternate path includes:

changing the next link in the primary path to a next link in the alternate path based on the non-congestion-related loss for the remote link; and forwarding the data packet to the next link in the alternate path; and the changing of the next link in the primary path to the next link in the alternate path includes:

determining non-congestion-related loss for the next link in the alternate path; and changing the next link in the primary path to the next link in the alternate path when the next link in the alternate path exhibits less non-congestion-related loss than the next link in the primary path.

* * * * *